US011509431B2

(12) United States Patent
Novak et al.

(10) Patent No.: US 11,509,431 B2
(45) Date of Patent: *Nov. 22, 2022

(54) METHODS AND SYSTEMS FOR RESOURCE ALLOCATION

(71) Applicant: Apple Inc., Cupertino, CA (US)

(72) Inventors: Robert Novak, Ottawa (CA); Mo-Han Fong, Sunnyvale, CA (US); Hang Zhang, Nepean (CA); Sophie Vrzic, Nepean (CA)

(73) Assignee: Apple Inc., Cupertino, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 16/940,286

(22) Filed: Jul. 27, 2020

(65) Prior Publication Data

US 2020/0403740 A1    Dec. 24, 2020

Related U.S. Application Data

(63) Continuation of application No. 16/157,413, filed on Oct. 11, 2018, now Pat. No. 10,727,989, which is a
(Continued)

(51) Int. Cl.
*H04L 5/00* (2006.01)
*H04L 1/18* (2006.01)
(Continued)

(52) U.S. Cl.
CPC .......... *H04L 5/0005* (2013.01); *H04L 1/1812* (2013.01); *H04L 1/1893* (2013.01);
(Continued)

(58) Field of Classification Search
CPC . H04W 52/34; H04W 52/243; H04W 52/146; H04W 52/16; H04W 52/362;
(Continued)

(56) References Cited

U.S. PATENT DOCUMENTS

| 10,009,149 B2 | 6/2018 | Fong et al. | |
|---|---|---|---|
| 2006/0126553 A1* | 6/2006 | Lim | .................. H04L 27/26025 370/321 |

(Continued)

FOREIGN PATENT DOCUMENTS

| CN | 101060700 | 10/2007 |
|---|---|---|
| JP | 0437328 | 7/1992 |

(Continued)

OTHER PUBLICATIONS

Part 16: "Air Interface for Broadband Wireless Access Systems, P80216Rev2 DI", IEEE Draft; P80216REV2 DI, IEEE-SA, Piscataway, NJ USA, vol. 802.16, Oct. 3, 2007, pp. 1-1897, XP01763190.

(Continued)

*Primary Examiner* — Awet Haile

(74) *Attorney, Agent, or Firm* — Kowert, Hood, Munyon, Rankin & Goetzel, P.C.

(57) ABSTRACT

Various methods and systems are provided for allocating time-frequency resources for downlink (DL) and uplink (UL) communications between base stations and mobile stations. Different forms of resource allocation messages including combinations of bitmaps and bitfields provide additional information about the resources and/or how they are assigned. In some implementations the resource allocation messages enable reduced overhead, which may ultimately improve transmission rates and/or the quality of transmissions.

20 Claims, 17 Drawing Sheets

Related U.S. Application Data continuation of application No. 15/473,768, filed on Mar. 30, 2017, now Pat. No. 10,110,353, which is a continuation of application No. 14/285,908, filed on May 23, 2014, now Pat. No. 9,614,650, which is a continuation of application No. 12/741,468, filed as application No. PCT/CA2008/001980 on Nov. 5, 2008, now Pat. No. 8,767,637.

(60) Provisional application No. 61/078,525, filed on Jul. 7, 2008, provisional application No. 61/046,625, filed on Apr. 21, 2008, provisional application No. 61/033,619, filed on Mar. 4, 2008, provisional application No. 60/986,709, filed on Nov. 9, 2007, provisional application No. 60/985,419, filed on Nov. 5, 2007.

(51) Int. Cl.
*H04W 52/48* (2009.01)
*H04W 72/12* (2009.01)
*H04W 52/34* (2009.01)
*H04W 72/04* (2009.01)

(52) U.S. Cl.
CPC ........... *H04L 5/0044* (2013.01); *H04W 52/34* (2013.01); *H04W 52/48* (2013.01); *H04W 72/04* (2013.01); *H04W 72/042* (2013.01); *H04W 72/0446* (2013.01); *H04W 72/12* (2013.01); *H04W 72/0453* (2013.01)

(58) Field of Classification Search
CPC . H04W 72/04; H04W 52/247; H04W 72/042; H04W 72/06; H04W 72/085; H04W 72/0406; H04W 72/08; H04L 5/044
See application file for complete search history.

(56) References Cited

U.S. PATENT DOCUMENTS

| | | | | |
|---|---|---|---|---|
| 2006/0274679 | A1* | 12/2006 | Khandekar | H04L 5/1461 370/278 |
| 2007/0104174 | A1* | 5/2007 | Nystrom | H04W 16/02 370/343 |
| 2007/0153834 | A1 | 7/2007 | Qu et al. | |
| 2007/0217362 | A1 | 9/2007 | Kashima et al. | |
| 2007/0223440 | A1* | 9/2007 | Ho | H04B 7/02 370/342 |
| 2007/0223606 | A1* | 9/2007 | Yang | H04L 5/0037 375/260 |
| 2008/0045174 | A1* | 2/2008 | Chen | H04B 7/2606 455/187.1 |
| 2008/0045272 | A1* | 2/2008 | Wang | H04W 72/0446 370/329 |
| 2008/0049692 | A1* | 2/2008 | Bachu | H04L 1/1819 370/338 |
| 2008/0062936 | A1* | 3/2008 | He | H04W 72/12 370/338 |
| 2008/0062944 | A1* | 3/2008 | Smith | H04L 1/1812 370/342 |
| 2008/0075032 | A1* | 3/2008 | Balachandran | H04W 72/04 455/423 |
| 2008/0080423 | A1* | 4/2008 | Kolding | H04L 1/1854 370/329 |
| 2008/0101307 | A1* | 5/2008 | Sindhushayana | H04W 52/346 370/337 |
| 2008/0117891 | A1* | 5/2008 | Damnjanovic | H04W 72/04 370/345 |
| 2008/0166969 | A1* | 7/2008 | Gorokhov | H04W 52/243 455/63.1 |
| 2008/0188234 | A1* | 8/2008 | Gorokhov | H04W 72/082 455/452.2 |
| 2009/0213750 | A1* | 8/2009 | Gorokhov | H04W 72/1231 370/336 |
| 2010/0189050 | A1* | 7/2010 | Beems Hart | H04W 72/0406 370/329 |
| 2012/0224502 | A1* | 9/2012 | Gorokhov | H04W 52/244 370/252 |
| 2016/0037529 | A1* | 2/2016 | Bourlas | H04W 72/0453 370/329 |

FOREIGN PATENT DOCUMENTS

| | | |
|---|---|---|
| JP | 8149553 | 7/1996 |
| JP | H0955764 | 2/1997 |
| JP | 2000278234 | 10/2000 |
| JP | 2003199147 | 7/2003 |
| JP | 2006514803 | 5/2006 |
| JP | 2006515141 | 5/2006 |
| JP | 2006237897 | 9/2006 |
| JP | 2007514352 | 5/2007 |
| JP | 2007194750 | 8/2007 |
| KR | 1020060132557 | 12/2006 |
| KR | 20070082827 A | 8/2007 |
| KR | 101779448 | 9/2017 |
| WO | 2004082200 | 9/2004 |
| WO | 2004086636 | 10/2004 |
| WO | 2005022811 | 3/2005 |
| WO | 2005060298 | 6/2005 |
| WO | 2006109439 | 10/2006 |
| WO | 2007044414 | 4/2007 |
| WO | 2007045101 | 4/2007 |
| WO | 2007065272 | 6/2007 |
| WO | 2007117120 | 10/2007 |
| WO | 2008096527 | 8/2008 |

OTHER PUBLICATIONS

Office Action from Korean Application No. 10-2010-7012353, dated Feb. 16, 2015, English and Korean versions, pp. 1-20.
"Part 16: Air Interface for Fixed and Mobile Broadband Wireless Access Systems Amendment for Physical and Medium Access Control Layers for Combined Fixed and Mobile Operation in Licensed Bands", IEEE P802.16e/D12, Oct. 2005, pp. 1-658.
Office Action from Japanese Application No. 2014075921, dated Mar. 25, 2015, Japanese and English versions, pp. 1-8.
Office Action from Chinese Application No. 200880124034.4, dated Jun. 9, 2014, English and Chinese versions, pp. 1-62.
Office Action from European Application No. 08846930.9, dated Jun. 20, 2014, pp. 1-11.
"Zone Based Resource Allocation for OFDMA Systmes", Krishna Balachandran, et al., 64th Vehicular Technology Conference, Sep. 2006, pp. 1-6.
Extended European Search Report for Application No. 14165117.4, dated Jul. 1, 2014, Apple Inc., pp. 1-11.
"Uplink Scheduling for VoIP", 3GPP TSG-RAN WG2 Meeting #57, Feb. 12-16, 2007, pp. 1-15.
Office Action, Korean Application No. 10-2014-7008775, dated Jul. 20, 2015, 5 pages.
Japanese Final Office Action, Application No. 2014-75921, dated Feb. 29, 2016, 14 pages.
Office Action for Korean Patent Application No. 10-2016-7015819, dated Sep. 13, 2016, pp. 1-7.
Search Report dated May 8, 2013 for corresponding European Patent Application No. 08846930.9, pp. 1-12.
"Part 16: Air Interface for Broadband Wireless Access Systems; P80216Rev2_D1", IEEE Draft; P80216REV2_D1, Oct. 3, 2007, cover pp. 1-48 and pp. 1-446.
Office Action dated Apr. 2, 2013, for corresponding Japanese Patent Application No. 2010-531388, pp. 1-4.
English translation of Office Action dated Apr. 2, 2013 for corresponding Japanese Patent Application No. 2010-531388, pp. 1-3.
Corrected International Search Report from corresponding PCT Application No. PCT/CA2008/001980 dated Mar. 19, 2009, 2 pages in total.

(56) References Cited

OTHER PUBLICATIONS

"Part 16: Air Interface for Fixed and Mobile Broadband Wireless Access Systems", IEEE P802.16Rev2/D1, Oct. 2007, pp. 159-160, p. 168, pp. 296,299, p. 443, pp. 724,729, pp. 782-789—figures 273,274, pp. 947,991-pp. 992,1007, p. 1012, p. 1101.
Extended European Search Report for European Patent Application No. 18158290.9, dated May 28, 2018, pp. 1-11.
Office Action for Chinese Patent Application No. 201510208579.5, dated Aug. 8, 2017, pp. 1-8.
Hyungho Park et al., "Downlink Control Structure related to Hybrid-ARQ", IEEE 802.16 Broadband Wireless Access Working Group, IEEE C802.16m-08/151, Mar. 10, 2008, pp. 1-6.
Kang Rui et al., Downlink Control Channel Design of IEEE 802.16m, IEEE 802.16 Broadband Wireless Access Working Group, C80216m-08/224r2, Mar. 17, 2008, pp. 1-9.

\* cited by examiner

| Number of Assignments | Combinations | Bit Field |
|---|---|---|
| 20 | 654729075 | 30 |
| 16 | 2027025 | 21 |
| 10 | 945 | 10 |
| 6 | 15 | 4 |
| 4 | 3 | 2 |

FIG. 10

METHODS AND SYSTEMS FOR RESOURCE ALLOCATION

RELATED APPLICATIONS

This application is a continuation of U.S. patent application Ser. No. 16/157,413, filed Oct. 11, 2018, entitled "Methods and Systems for Resource Allocation", invented by Robert Novak et al., which is a continuation of U.S. patent application Ser. No. 15/473,768, filed Mar. 30, 2017, now issued as U.S. Pat. No. 10,110,353, having the same title, which is a continuation of U.S. patent application Ser. No. 14/285,908, filed May 23, 2014, now issued as U.S. Pat. No. 9,614,650, having the same title, which is a continuation of U.S. patent application Ser. No. 12/741,468, filed May 5, 2010, now issued as U.S. Pat. No. 8,767,637, having the same title, which claims the benefit of and is a National Phase Entry of International Application No. PCT/CA2008/001980, filed Nov. 5, 2008, which claims the benefit of:

U.S. Provisional Patent Application No. 60/985,419, filed Nov. 5, 2007;

U.S. Provisional Patent Application No. 60/986,709, filed Nov. 9, 2007;

U.S. Provisional Patent Application No. 61/033,619, filed Mar. 4, 2008;

U.S. Provisional Patent Application No. 61/046,625, filed Apr. 21, 2008; and

U.S. Provisional Patent Application No. 61/078,525, filed Jul. 7, 2008.

All of above-identified applications are hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The invention relates to wireless communication systems in general, and to assigning transmission resources, in particular.

BACKGROUND OF THE INVENTION

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network. The CDMA 2000 wireless access technology from 3GFP2 is also evolving. The evolution of CDMA 2000 is referred to as the Ultra Mobile Broadband (UMB) access technology, which supports significantly higher rates and reduced latencies.

Another type of wireless access technology is the WiMax (Worldwide Interoperability for Microwave Access) technology. WiMax is based on the IEEE (Institute of Electrical and Electronics Engineers) 802.16 Standard. The WiMax wireless access technology is designed to provide wireless broadband access.

The existing control channel design used for the various wireless access technologies discussed above are relatively inefficient. The control channel, which contains control information sent from a base station to mobile stations to enable the mobile stations to properly receive downlink data and to transmit uplink data, typically includes a relatively large amount of information. In some cases, such control channels with relatively large amounts of information are broadcast to multiple mobile stations in a cell or cell sector. The overhead associated with such broadcasts of control channels makes using such techniques inefficient, since substantial amounts of available power and bandwidth may be consumed by the broadcast of such control channels. Note that the power of the broadcast control channel has to be high enough to reach the mobile station with the weakest wireless connection in the cell or cell sector.

The control channel design in IEEE 802.16e, as a particular example is inefficient in both power and bandwidth. Since the control channel is always broadcast to all users using full power with a frequency reuse factor of N=3, it consumes a significant portion of the available power and bandwidth. Another disadvantage of the current control channel design is that it allows for many different signalling options, which significantly increases the control channel overhead.

Although the control channel design in UMB and LTE is more efficient, both can be further optimized in order to reduce power and bandwidth overhead.

SUMMARY OF THE INVENTION

According to an aspect of the invention, there is provided a method comprising: in a time-frequency transmission resource comprising a plurality of transmission symbols, each on a plurality of sub-carriers: creating one or more subzones of the time-frequency transmission resource wherein each subzone comprises at least one block of channel units comprising at least one sub-carrier used for all transmission symbols in the subzone; scheduling at least one user in at least one of the one or more subzones; controlling distribution of transmission power over the one or more subzones.

In some embodiments, the method further comprises, when more than one subzone is created: grouping two or more subzones together to form at least one subzone group; controlling distribution of transmission power for each subzone group over the two or more subzones in each respective subzone group.

In some embodiments, the method further comprises, for a plurality of time-frequency transmission resources: scrambling the arrangement of subzones in at least one of the subzone groups in at least two of the plurality of time-frequency transmission resources.

In some embodiments, the method further comprises, for a plurality of sectors in a telecommunication cell: scrambling the arrangement of subzones in at least one of the subzone groups in at least two of the plurality sectors.

In some embodiments, the method further comprises, when physical sub-carriers are scrambled according to a given permutation mapping to produce logical subcarriers in the time-frequency transmission resource: utilizing a different permutation mapping in at least two of the one or more subzones.

In some embodiments, scheduling at least one user in at least one of the one or more subzones comprises: scheduling a user in the subzone with the largest available time-frequency resource.

In some embodiments, for a plurality of time-frequency transmission resources, scheduling at least one user in at least one of the one or more subzones comprises: assigning a portion of at least one subzone in one or more of the plurality of time-frequency transmission resources to a user on a persistent basis.

In some embodiments, assigning a portion of at least one subzone in one or more of the plurality of time-frequency transmission resources to a user on a persistent basis comprises: assigning the portion of the at least one subzone for a first HARQ transmission.

In some embodiments, for synchronous HARQ, assigning the portion of the at least one subzone for a first HARQ transmission comprises: assigning the portion on a reoccurring basis that is different than an interlace on which HARQ retransmissions occur.

In some embodiments, assigning the portion on a reoccurring basis that is different than an interlace on which HARQ retransmissions occur comprises: assigning the portion on every Mth transmission resource of the plurality of transmission resources when the interlace is every Nth transmission resource of the plurality of transmission resources.

In some embodiments, the method further comprises, when the portion of at least one subzone that is assigned on a persistent basis is not used: releasing the portion that is assigned on a persistent basis for at least a temporary duration of time; reassigning it to a different user for a temporary duration.

In some embodiments, releasing the portion that is assigned on a persistent basis for at least a temporary duration of time comprises releasing the portion based on one or more of: a timeout since a last communication has occurred; an occurrence of N, N>=1, packet transmission or reception failures; or an explicit deassignment of resources.

In some embodiments, releasing the portion that is assigned on a persistent basis for at least a temporary duration of time is a result of a message received along with the original message assigning the portion of at least one subzone on a persistent basis.

In some embodiments, the method further comprises assigning HARQ retransmission using at least one of unicast or group signaling.

According to another aspect of the invention, there is provided a method comprising: in a time-frequency transmission resource comprising at least one subzone, each subzone comprising at least one partition, each partition having at least one resource block, each resource block having a plurality of transmission symbols on a plurality of sub-carriers, wherein one or more resource blocks are allocated to each of at least one user in a respective partition; for each partition, signalling a group of users with a group bitmap, wherein the group bitmap includes at least one bitfield that provides additional information about the one or more resource blocks allocated to the at least one user of the respective partition.

In some embodiments, signalling a group of users with a group bitmap, wherein the group bitmap includes at least one bitfield comprises: signaling a group bitmap with a permutation index bitfield; and signaling a group bitmap with a user pairing or user sets combination index bitfield.

In some embodiments, signalling the group bitmap with a permutation index bitfield comprises: assigning different numbers of resource blocks to respective users of the croup of users.

In some embodiments, signalling the group bitmap with a permutation index bitfield comprises: signaling a bitfield that has a logical mapping to a particular number of resource blocks per user for a respective partition.

In some embodiments, signalling a group bitmap with a user pairing or user sets combination index bitfield comprises: assigning users having resource block assignments into sets of two or more.

In some embodiments, signalling a group bitmap with a user pairing or user sets combination index bitfield comprises: signaling a bitfield that has a logical mapping to one or more sets of two or more users.

In some embodiments, the method further comprises: decoding the group bitmap by a user is at least in part performed as a function of having knowledge of the size of the group bitmap.

In some embodiments, the size of the group bitmap is: known by the user; determinable by a user; determinable to a set of possibilities by the user.

In some embodiments, signalling a group of users with a group bitmap that includes at least one bitfield comprises: signalling a group of users with a group bitmap that comprises: a first portion of the at least one bitfield that indicates a number of bits N that are used to define further transmission information; and a second portion of the at least one bitfield that indicates one of a plurality of transmission information modes that has $2^N$ states.

In some embodiments, signalling a group of users with a group bitmap in which the first portion of the bitfield indicates that the number of bits is equal to one, comprises: indicating one of a plurality of transmission information modes that has 2 states, the one of the plurality of modes being one of: a new packet toggle (NPT) bitfield that signals an alternating bit each time transmission of a new packet is started; a new HARQ packet start indicator bitfield that signals a new packet HARQ transmission or a HARQ re-transmission; a multiple packet (MP) bitfield that signals that two packets are being transmitted to a mobile station; a subpacket HARQ transmission index bitfield that signals a subpacket ID for HARQ transmissions for up to two states; a packet start frame (PSF) within a superframe that signals two starting points, one for each packet, per user, per frame; a packet information field states bitfield that signals two different packet sizes, in which the resource allocation size stays the same.

In some embodiments, signalling a group of users with a group bitmap in which the first portion of the bitfield indicates that the number of bits is equal to two, comprises: indicating one of a plurality of transmission information modes that has 4 states, the plurality of modes being one of: a subpacket HARQ transmission index SPID bitfield signals a subpacket ID for HARQ transmissions for up to four states; a modified HARQ sub-packet identification bitfield that signals a new or subsequently packet transmission; a new packet toggle (NPT) (multi-state toggle) bitfield that signals a different bit each time transmission of a new packet is started; a packet start frame (PSF) within superframe that signals up to four start points, one for each packet, per user, per frame to be signalled uniquely; a 4-packet bitfield that signals four packets are being transmitted to a mobile station; a 1-Bit mode selector, 1 Bit Mode bitfield that signals a first bit of the two bits is used to select between two modes, while a second bit of the two modes indicates which of the two states the mode is in; and one or more hybrid bitfields.

In some embodiments, the method further comprises: for a given user, transmitting a configuration of the group bitmap to the user in a message used to assign the user to a group of users.

In some embodiments, the method further comprises: decoding the group bitmap by a user is at least in part performed as a function of having knowledge of the size of the group bitmap.

In some embodiments, the size of the group bitmap is: known by the user; determinable by a user; determinable to a set of possibilities by the user.

According to yet another aspect of the invention, there is provided a method comprising: in a two dimensional transmission resource, a first dimension being time and a second dimension being frequency: as a default setting, allocating resources for at least one user in the two dimensional transmission resource in one of the two dimensions first and the other dimension second.

In some embodiments, allocating resources for at least one user in the two dimensional transmission resource in one of the two dimensions first and the other dimension second comprises: providing an indication that allocating resources for at least one user can be performed in a reverse order of the default setting.

In some embodiments, the two dimensional transmission resource comprises at least one subzone within the time-frequency transmission resource, wherein each subzone comprises at least one transmission symbol over at least one sub-carrier, the method comprising: allocating resources for each subzone according to the same dimensional order of allocation; or allocating resources for at least one subzone according to the default setting dimensional order of allocation and the remainder of subzones according to a reverse dimensional order of allocation.

In some embodiments, allocating resources for at least one user in the two dimensional transmission resource comprises: allocating resources that are contiguous in at least one dimension.

In some embodiments, allocating resources that are contiguous in at least one dimension comprises one of: allocating resources that are contiguous logical channels; and allocating resources that are contiguous physical channels.

In some embodiments, allocating resources for at least one user in the two dimensional transmission resource comprises: assigning an allocated resource on a persistent basis.

In some embodiments, after a request has been granted for assigning an allocated resource on a persistent basis; for a first packet, which may have triggered the request for the assigning of an allocated resource on a persistent basis: encoding the first packet with a second packet and transmitting the two packets on the persistently assigned resource; or scheduling the first packet separately from the allocated resource that is assigned on a persistent basis.

In some embodiments, encoding the first packet with a second packet and transmitting the two packets on the persistently assigned resource further comprises at least one of: increasing a size of the allocated resource for at least a first occurrence of the persistently assigned resource; and adjusting the modulation and coding scheme (MCS) and maintaining a consistent size for the allocated resource.

In some embodiments, scheduling the first packet separately from the allocated resource that is assigned on a persistent basis further comprises: scheduling the first packet on a separate resource than that of a resource assigned on the persistent basis, wherein the separate resource is scheduled: in a same frame as the first occurrence of the allocated resource that is assigned on a persistent basis; or in a different frame than that of the first occurrence of the allocated resource that is assigned on a persistent basis.

In some embodiments, the method further comprise: providing an indication of whether encoding the first packet with a second packet is performed or scheduling the first packet separately from the allocated resource is performed.

According to yet a further aspect of the invention, there is a method comprising: in a two dimensional transmission resource, a first dimension being time and a second dimension being frequency, allocating a resource of a first size to at least one user in the two dimensional transmission resource and allocating a resource of a second size to at least one user in the two dimensional transmission resource.

In some embodiments, the method further comprises: multiplexing the at least one user of a resource of the first size and the at least one user of a resource of the second size in at least one of the following ways: for two groups, starting each group from opposite ends of the resource space; each group is given boundaries of allocation space; each group is assigned starting (or ending) points for allocation space; allocation of each group in a different subzone; and allocation of each group in a different interlace.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which:

FIG. 10 is an exemplary table of numbers of combination, and associated bit field that indicate possible pairings of users for particular numbers of assignments;

DETAILED DESCRIPTION OF THE EMBODIMENTS OF THE INVENTION

Figure 1:
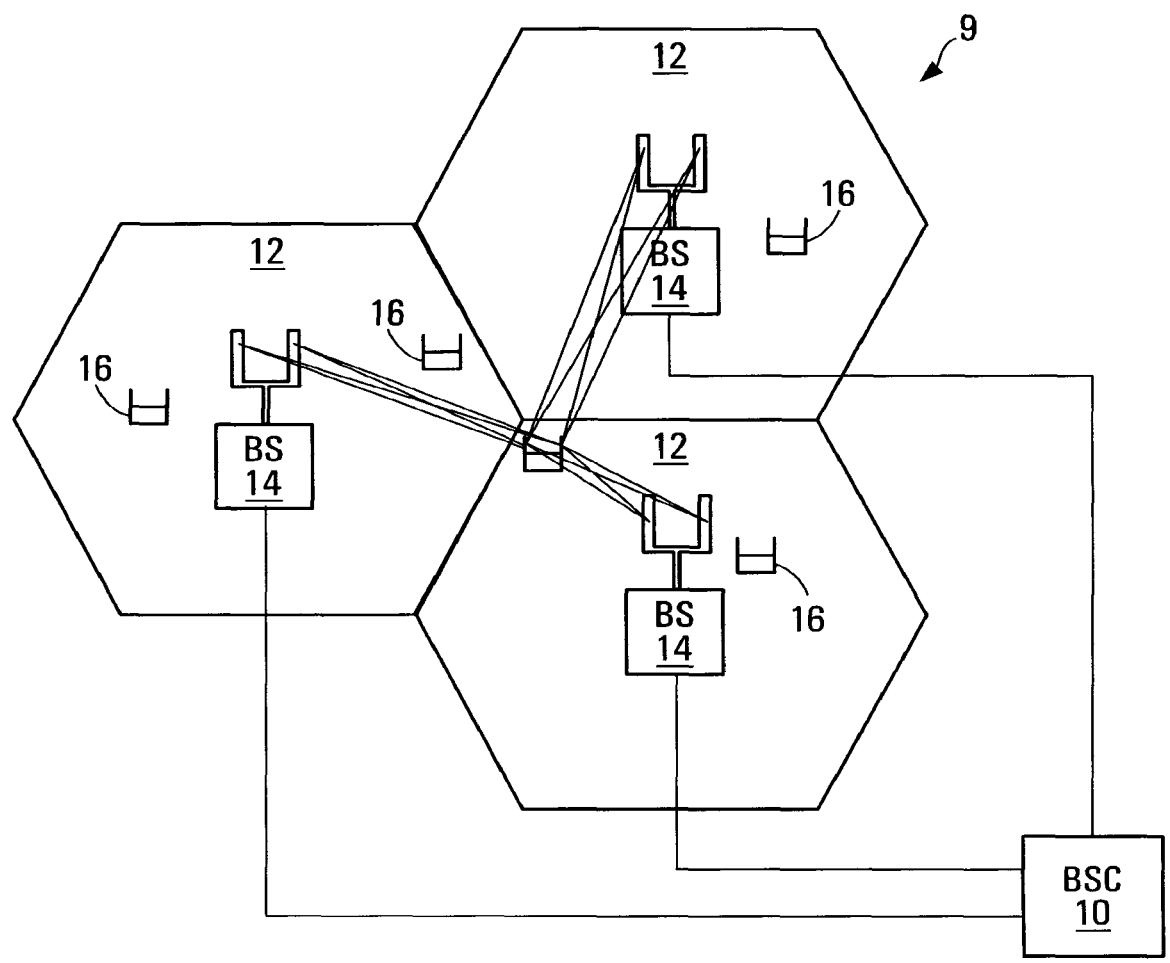
FIG. 1 is a block diagram of a cellular communication system on which embodiments of the invention may be implemented.

For the purpose of providing context for embodiments of the invention for use in a communication system, FIG. 1 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The mobile terminals 16 may be referred to as users or UE in the description that follows. The individual cells may have multiple sectors (not shown). The movement of the mobile terminals 16 in relation to the base stations 14 results in significant fluctuation in channel conditions. As illustrated, the base stations 14 and mobile terminals 16 may include multiple antennas to provide spatial diversity for communications.

Methods of transmission resource allocation described herein may be performed for one or both of uplink (UL) and downlink (DL). UL is transmitting in a direction from a mobile station to a base station. DL is transmitting in a direction from the base station to the mobile station.

Power Control and Allocation

In some embodiments, subzones can be created within a frame structure to allow power distribution over a set of assignments. A frame is a physical construct for transmission that once it is set is not changed, while a subzone is a portion a frame that is configurable as a scheduling construct, whose size and shape may change within the frame for a given situation. For example, in an OFDM application, subzones may consist of multiples of 2 OFDM symbols over a block of sub carriers. In some embodiments, the block of sub-carriers is the entire set of the sub-carriers of an available band.

In some embodiments, a basic channel unit (BCU) allocation block (BAB) may consist of one or more BCUs. A BCU is a two dimensional time-frequency transmission resource, i.e. a given number of symbols over a given number of sub-carriers. The sub-carriers may be physical sub-carries or logical sub-carriers that are permuted based on a particular mapping of physical sub-carries to logical sub-carries. In some embodiments, within a subzone, a BAB has a same number of time-frequency resource blocks per OFDM symbol. In some embodiments, this may be true when averaged over one or more frames. While OFDM symbols are referred to specifically, it is to be understood that OFDM is considered for illustrative purposes, and other transmission formats are contemplated.

In some embodiments, different subzones may have different BAB configurations. For example, a first subzone has 4 OFDM symbols in which each BAB has 2 BCUs. In another example, a second subzone has 4 OFDM symbols, in which some BABs have 4 BCUs and other BABs have 8 BCUs. In yet another example, a third subzone has 6 OFDM symbols, in which each BAB has 12 BCUs.

In some embodiments power control can be done on a per subzone basis. In some embodiments, each BAB is power controlled independently, given a BAB power constraint for one subzone. As power is constrained per subzone in such a case, a power constraint per OFDM symbol is also satisfied.

In some embodiments, packing of users in available resources is based on resource requirements of the users. In some embodiments, scheduling users in subzones is based on random selection of the users to available resources.

In some embodiments, a single subzone may occur over all OFDM symbols in the frame.

Figure 19:
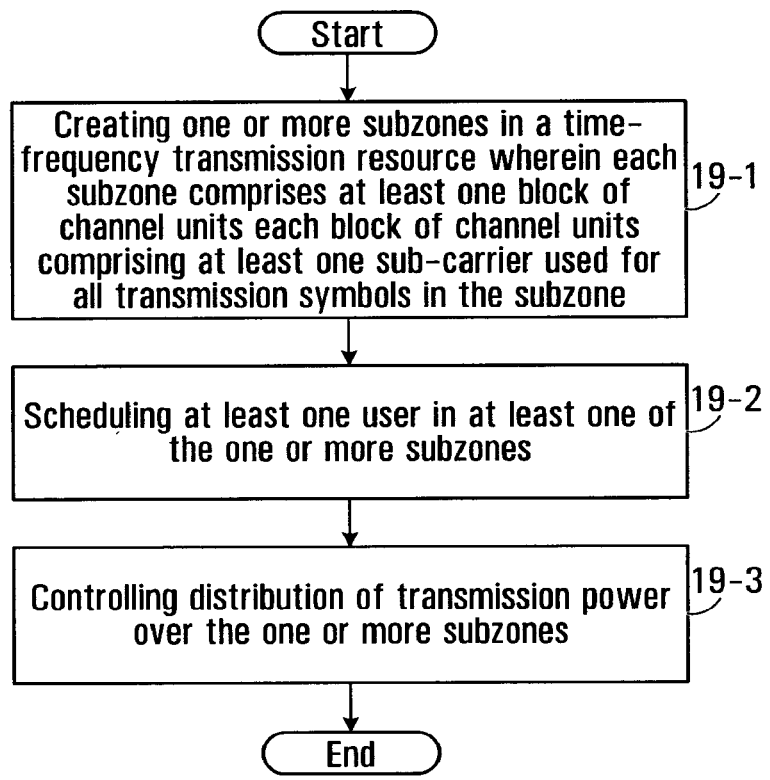
FIG. 19 is a flow chart for an example of a method according to some embodiments of the invention.

Referring to FIG. 19, a method will now be described for allocating transmission resources in a time-frequency transmission resource comprising a plurality of transmission symbols, each on a plurality of sub-carriers.

A first step 19-1 involves creating one or more subzones of the time-frequency transmission resource wherein each subzone comprises at least one block of channel units, each at east one block of channel units comprising at least one sub-carrier used for all transmission symbols in the subzone.

A second step 19-2 involves scheduling at least one user in at least one of the one or more subzones.

A third step 19-3 involves controlling distribution of transmission power over the one or more subzones.

Interference Diversity

In some embodiments, subzones can be grouped so that a similar BAB is present in one or more subzones that form the group. In some embodiments, diversity can occur by using sector-specific subzone groups. That is groups of subzones may be specific to a sector of a multi-sector telecommunications cell.

In some embodiments, scrambling of resource assignment may occur between subzones of the same group. In some embodiments, scrambling of logical resources of each BCU occurs for different OFDM symbols.

Figure 2:
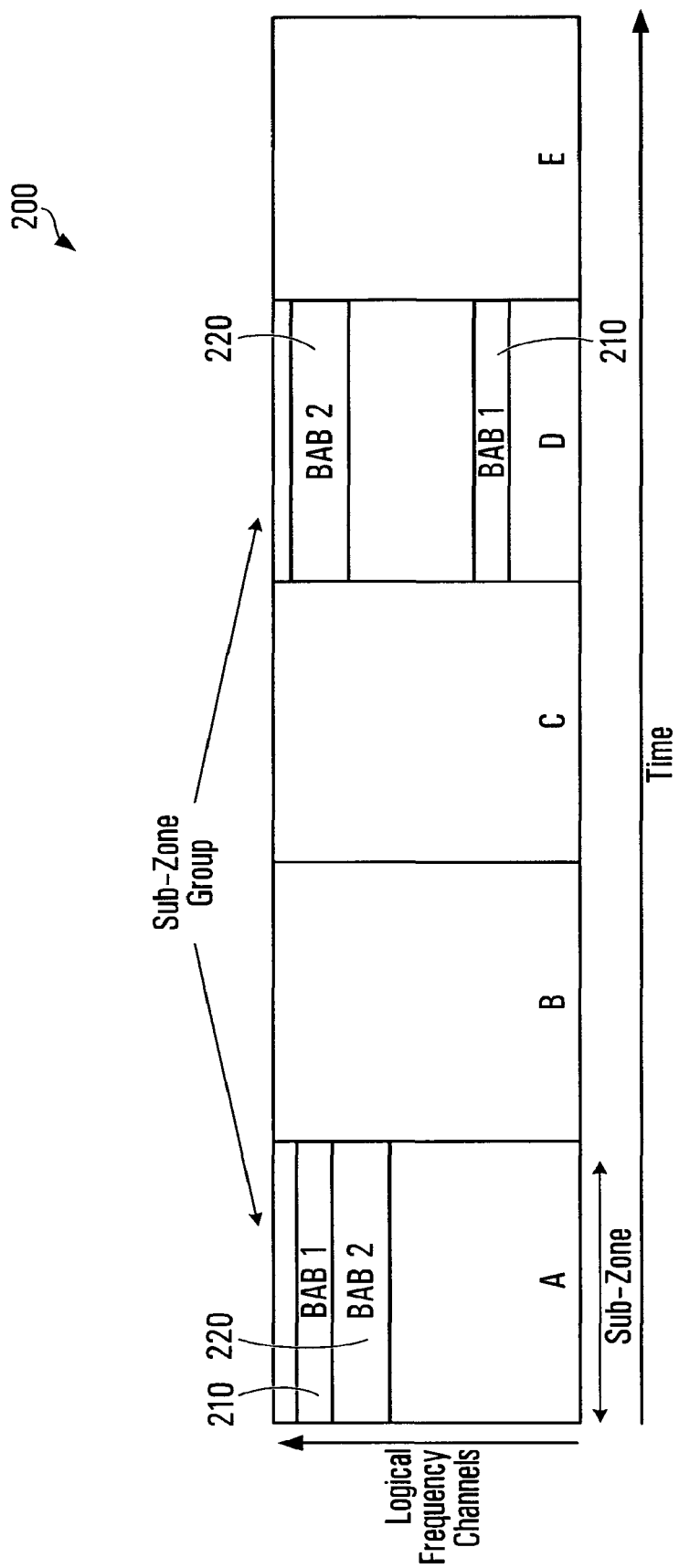
FIG. 2 is a schematic diagram that illustrates an example of a frame having subzones, in which one or more subzones having similar basic channel unit (BCU) allocations are grouped together according to an embodiment of the invention.

FIG. 2 illustrates an example of a frame 200 having subzones A, B, C, D and E. Subzones A and D each have a first BAB, BAB 1 210 and a second BAB 2 220. Subzones A and D are grouped together as they both include BAB 1 210 and BAB 2 220. However, in the illustrated example, BAB 1 210 and BAB 2 220 occur over different resource blocks in subzones A and D. In a different sector, it is possible that subzone A would not be paired with subzone D.

In some embodiments, transmission power is constrained over a group of subzones. Sector specific scrambling may increase the number of BABs from other sectors which a given BAB interferes with, thus averaging the interference from those BABs. In some implementations, using such scrambling of interferences results in a signal that has components from many different BABs, which can be advantageous to system performance.

In some embodiments, for each frame, the mapping of logical to physical resource blocks may be scrambled. This may also be referred to as a resource block permutation.

In some embodiments in which subzone groups are considered the grouping of subzones may be scrambled in different frames.

In some embodiments, if sub-frames are created in a frame, a subzone to sub-frame mapping is one-to-one.

In some embodiments, when persistent resource assignments are used, permuting the physical to logical resources, scrambling of the groupings of subzones, sector specific scrambling, BAB sizes and locations are all predefined.

Scheduling Flow

In some embodiments, a scheduler will attempt to schedule a user in the subzone with the most available resources. The scheduler may be located in a base station and perform scheduling for DL and UL. In particular, this may be the subzone with the most available bandwidth resources. After allocation for that user, the scheduler can repeat the process for the next user.

In some embodiments, if a user cannot be scheduled in a given subzone, possibly due to, but not limited to, a lack of resources, the scheduler will try to schedule the user in another subzone. If unsuccessful, this may continue until all subzones have been attempted.

In some embodiments, after all resource assignments have been made, power may be redistributed among the resource assignments in a given subzone.

Persistent Assignment and Termination

Figure 3:
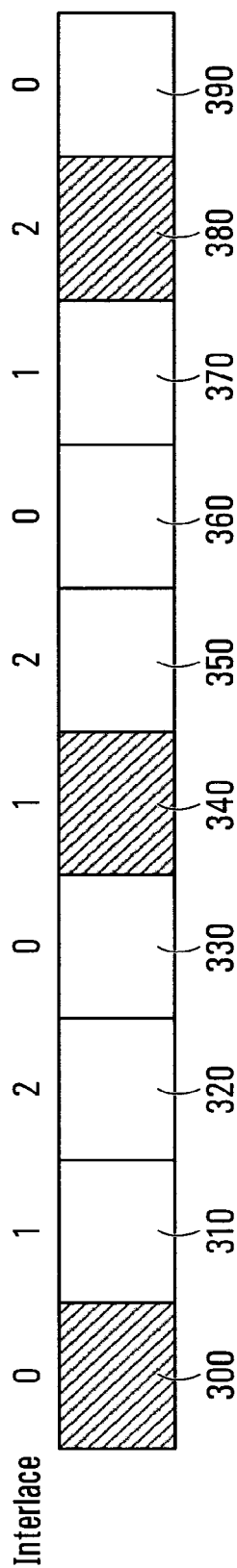
FIG. 3 is a schematic diagram that illustrates an every third frame interlace structure, with a persistent resource allocation in every fourth frame according to an embodiment of the invention.

FIG. 3 illustrates a transmission structure that is formed of multiple frames 310, 320, 330, 340, 350, 360, 370, 380 and 390. Each frame may have one or more subzone. In some embodiments the subzones are of a similar type to those illustrated in FIG. 2. The transmission structure has a persistent resource scheduled every fourth frame and has an every third frame interlace. A persistent resource assignment is an assignment of a predefined, usually reoccurring, resource to a user, such that assignment to that user does not require further signalling for each reoccurrence. Retransmissions are transmitted on a common interlace. The persistent resource is scheduled in frames 300, 340, and 380. Frames 300, 330, 360 and 390 are a first interlace "0", frames 310, 340 and 370 are a second interlace "1" and frames 320, 350 and 380 are a third interlace "2".

In a given frame, during a silence interval, or possibly during packet arrival jitter, the persistent resource assigned to a first user may not be needed for that first user's packet transmission. This resource can then be reassigned to another user. If other users have their first HARQ transmissions persistently assigned, then the first user's persistent resource assignment may be used for re-transmissions of other users during the given frame. The persistent resource assignment is only reassigned for the given frame. At the next occurrence of the persistent resource assignment, the same decision flow is repeated to determine if the first user has need of the persistent resource. The user who is assigned a persistent resource has top priority when considering who may use the resource.

FIG. 3 is merely an example, and it is to be understood that the assignment of a persistent resource to a given periodic resource and a particular interlace are implementation specific parameters.

In some embodiments, persistent resource assignment may be used for one or more HARQ transmissions. An example implementation utilizes persistent resource assignment for a first HARQ transmission. The predefined persistent resource occurs regularly at an interval for the first HARQ transmission of the user. In some embodiments, re-transmissions are non-persistent. In some embodiments, re-transmissions are assigned by a unicast signalling scheme. In some embodiments, re-transmissions are signalled using group signalling.

In synchronous HARQ, re-transmissions occur after the original transmissions in a same interlace as the first transmission. In some embodiments, the persistent resource may or may not re-occur in the same interlace. In the illustrated example, as the persistent resource assignment is every fourth frame and there are three interlaces, the persistent resource only occurs in the same interlace every twelfth frame.

In some embodiments, the persistent resource can be released when not in use. An example of when a persistent resource may be released is during a silence period in a VoIP call. The persistent assignment may be released as a result of one ore more actions including, but not limited to: timeout since last transmission; after N packet transmission or reception failures, where N=>1; explicit deassignment of resources; implicit deassignment of resources by reassignment of resources to another user.

In some embodiments, a persistent resource may not be needed by the user. This may occur for any number of reasons including, but not limited to, silence intervals (for VoIP), delayed packet arrival due to jitter, and HARQ early termination. In some embodiments when the persistent resource is not needed by the user, the resource may be reassigned for other transmissions or re-transmissions. In some embodiments, temporary assignment of the persistent resource to another user does not deassign the persistent allocation to the original user.

In some embodiments, the persistent allocation may be deassigned by a longer-term timeout, if no packet is successfully received.

A persistent assignment may be terminated by a failure to correctly decode a HARQ transmission after N packets, where N is known or configured. A persistent assignment may be terminated due to a short timeout (for example, ~20-40 ms) during which a packet was not correctly decoded. Allowing termination of a persistent resource due to these reasons may be advantageous when there are no transmissions during silence periods.

A persistent assignment may be terminated due to a long timeout (for example, ~200-300 ms) over which a packet was not correctly decoded. The timeout duration may be longer than an interval of packets transmitted during a silence interval.

In some embodiments, during the silence interval, if a packet is received, the persistent resource is maintained. Otherwise, the persistent resource will be terminated when a timeout timer expires.

Allowing termination of a persistent resource due to one or more of the above reasons may be advantageous when there are comfort noise, silence indicator packets or other transmissions that may occur during silence periods of a voice call.

In some embodiments, a persistent resource is reassigned to other users when not in use.

In some embodiments, indication of a persistent assignment in which the resource is temporarily assigned to other users can be specified in an original message that defines the persistent assignment. In some embodiments, this may also implicitly specify the associated persistent assignment termination conditions. This may be a message type of a bitfield indicator.

In some embodiments, power control adaptation may be used for resource allocation of persistent and/or non-persistent assignments.

Resource/Modulation and Coding Scheme (MCS) Adaptation and Persistent Transmissions In some embodiments, power control is used to achieve transmission targets for data packets. Examples of transmission targets may include, but are not limited to, bit error rate (BER), packet error rate (PER), rates of transmission, quality of service (QoS), Delay, and outage criteria. In other embodiments, resource/modulation coding scheme (MCS) adaptation is used.

Resource/MCS adaptation may involve MCS selection based on CQI and MCS selection thresholds. The selection thresholds may include variable margin levels for the thresholds and/or may be adjusted to achieve some metric, which may include, but are not limited to, a HARQ termination target, a packet error rate (PER), a residual PER, or a lowest delay.

Resource/MCS adaptation may involve determination of resource size based on one or more of: packet size; the MCS; and, if present, any type of spatial multiplexing method that may be a part of the transmission process.

In some embodiments a persistent resource assignment is used for first HARQ transmissions, and the assignment of the persistent resource may be known to a user, determinable by the user, or determinable by the user from a known set of MCSs being used for transmission. In some embodiments, HARQ re-transmissions, if needed, are allocated non-persistently by using resource/MCS adaptation. In some implementations, a resource map is used to indicate which resources are available or not currently being used for active persistent resource assignments. A particular example is a resource availability bitmap described below.

For example, first HARQ transmissions may be persistently assigned to a particular resource for a given user. For re-transmissions, non-persistent assignments may be used. The resources assigned for each re-transmission are adaptively chosen based on, but not limited to, one or more of: information of channel conditions; MCS selection thresholds; and packet size (e.g. bits).

Resources for the re-transmissions may be allocated to the user using one or more of: an indication of assigned resources; an indication of assigned resources and an indication of available resources; an indication of assigned resources and an indication of non-available resources; and an indication of an assignment and other assignments in some resource set from which the assignment is derived.

In some embodiments, allocation of transmission power is fixed for each transmission and re-transmission. In some cases the power may change for each re-transmission, but non-adaptively with respect to channel conditions.

Some embodiments of this invention include a mechanism for resource allocation of services including, but not limited to, continuous and real time services. Several examples of a real time service are VoIP, video telephony (VT), and UL gaming. In some embodiments, the methods described herein may aid in improving the flexibility of assigning resources for continuous and real time services.

In some embodiments of the invention, group allocation of resources is considered. Group allocation may be performed by signalling groups of users together using a bitmap or bitmaps. In some embodiments, the use of group allocations may be improved by reducing the size of groups and using hypothesis detection in each frame to decode the bitmaps. In some embodiments, additional fields in the bitmap, if present, support collaborative MIMO and variable resource allocation, as will be discussed in detail below.

In some embodiments, techniques described herein can be combined with a control channel signalling method using resource partitions. An example of such a control channel signalling method is described in commonly owned patent application Ser. No. 12/202,741 filed Sep. 2, 2008, which is incorporated herein by reference in it's entirety.

In some embodiments, unicast signalling may be used for assignment and/or allocations of user traffic. Such a signalling scheme is flexible in allocating resource to various locations and of various sizes. The unicast scheduling scheme may also include other parameters that can be uniquely specified for a given assignment. In some embodiments, unicast signalling can appear at a known position in the resource partition, possibly the beginning. In these cases, the intended users(s) can derive parameters of the assignment by decoding the signalling message. In some embodiments, the position of the signalling is only known to be in one of many finite positions.

In some embodiments, bitmap signalling can be used for persistent assignment assignments, or to indicate persistent assignments.

In some embodiments, group assignment can be used with a partition-type assignment structure, with one or more partitions being used for the group assignment. In some embodiments, HARQ re-transmissions are also sent within the partitions.

In some embodiments, bitmap structure, bitmap configuration, bitmap size, bitmap fields or other parameters may be different for different group bitmaps within the same frame, subframe or other time-frequency resource in which multiple group bits maps coexist.

In some embodiments, in order to facilitate hypothesis detection to decode bitmaps, the bitmap length (which in some cases include additional bitfields in the bitmap) are: known by a user; determinable by a user; or determinable to a set of possibilities by a user. In some embodiments, as a size of some additional bitfields in a given partition are related to a number of assignments in the given partition, bitfield sizes may be derived from: a number of resources in the given partition and/or a number of resources per assignment in the given partition.

When considering the formation of groups of users for allocation of resources, users are divided into groups based on particular parameters. Examples of parameters include, but are not limited to: frequency of resource assignments, which in some embodiments may be related to service class; geometry, which may be related to resource allocation as well; and interlace assignment group. In some embodiments, groups may also have one or more of the same MIMO mode; resource allocation size; and MCS (or at least, a subset of all MCSs so reasonable hypothesis detection).

In some embodiments, it is possible to wait until many users in a group have packets to transmit, and then use a group assignment. In some embodiments, a larger regular group bitmap transmission interval is used for this purposes and/or limiting the sizes of groups.

For groups that are based on service class, it is understood that some services utilize frequent transmission (VoIP), while other services utilize less frequent transmission.

In some embodiments, when groups are based on geometry, the group signalling may use an interlace assignment or an interlace offset assignment for first HARQ packet transmission as described above. In some embodiments, groups are formed based on geometry, which may be advantageous for power efficiency.

In some embodiments, group signalling is sent for every transmission and retransmission.

In some embodiments, all users in a group have a same "first transmission frame", meaning that all of the users receive a first HARQ transmission of a subpacket at the same time. This may be true for each occurrence of a new packet.

In some embodiments, all users in a group may be assigned to start first HARQ transmissions on the same reoccurring frame. In such a case, a bitmap may be omitted if no users require a re-transmission or additional subsequent retransmission.

In some embodiments, resource partitions in a time frequency resource, such as, for example a frame, are created. Partitions are a set of one or more resource blocks that may or may not be a contiguous resource set. In examples described herein, partitions are considered to be created from "ordered" resources, where the order is known at receivers and transmitters, but the order of the resources are not necessarily contiguous physical resources. They may be logical resources resulting from a mapping, or permutation, of physical resources.

In some embodiments, frequency selective scheduling is also supported within group structure. Frequency selective scheduling permits channel construction through physically adjacent tones. With frequency selective transmissions, adaptive matching of modulation, coding, and other signal and protocol parameters to conditions of a wireless link may be performed to increase the likelihood of successful receipt of data by a receiving entity over a wireless link.

Group Signalling

In some implementations, group resource assignment resource partition(s) are created. This may include a single partition or multiple partitions formed in the time-frequency resource.

Resource partitions can be used for group signalling or unicast signalling. Group signalling can use one or more of the following types of bitmaps: a resource availability bitmap (RAB); an assignment bitmap; a resource permutation index; and a pairing or set combination index. Additional bitfields may be included with the various bitmaps.

The terms bitmap and bitfield are used to define a field of bits used for allocation signaling, for example a resource allocation message. The terms are substantially interchangeable in that they both are used to define the bits used for allocation signalling. Use of one term or the other when applied to a given field of bits is not intended to limit the scope of the invention.

Resource Availability Bitmap (RAE)

The RAB has a length that may be fixed, based on another parameter, or derivable from a partition size. Each bit in the bitmap maps to a defined resource block or set of resource blocks. An example of a resource block is a basic channel unit (BCU) that is a time-frequency resource having one or more OFDM symbols over a set one or more sub-carriers. In some embodiments, the RAB may be configured to include entries for resources for signalling as well as data. In other embodiments, such entries will not be included.

Each bit in the RAB indicates if an associated resource is in use, or is available for assignment. The length of the RAB is equal to the number of resources in a given partition for group traffic, after resources for group signalling, if any, are removed.

In some embodiments, the bitmap may be known as persistent assignment bitmap.

In some embodiments, users can derive their resource allocation from signalling and the RAB.

In some embodiments, persistent assignments that are in use can be indicated by this bitmap. In some embodiments, resources associated with persistent assignments that are not in use because of early HARQ termination, silence periods or otherwise, can be indicated as available in the resource availability bitmap.

Assignment Bitmap

Users are assigned positions in a given partition with the use of the assignment bitmap. Each bit in the assignment bitmap allows for a resource assignment. In some embodiments, multiple positions may be assigned to a single user, or positions may also be shared.

Users can determine their allocation by reading the entire assignment bitmap in some predefined order, such as left-to-right, for example.

A first indicated assignment in the assignment bitmap is assigned a first available resource block of the partition; a second indicated assignment in the bitmap is assigned a second available resource block, and so on, for each available resource block in the partition.

The length of the assignment bitmap can be signalled to users in the user group.

In some embodiments, this assignment may also be used to indicate each HARQ transmission and re-transmission.

Resource Permutation Index Bitmap (Fixed or Determinable Length Bitfield)

This bitmap is used to assign different numbers of resources to users of a given group in a given partition.

In some embodiments, this bitmap indicates the resource size for each assignment in the given partition by specifying an index, which directly or indirectly defines a permutation of resources assignments for the partitions.

In some embodiments, the length of this field is large enough to provide signalling for the maximum number of partitions possible in a frame. In some embodiments, the length of the bitmap is fixed. In some embodiments, for the purposes of hypothesis detection, the length of the bitmap is known by the user, determinable by the user, or determinable to a set of possibilities by the user.

In some embodiments, if used with a localized channelization scheme, which is used for contiguous physical sub-carriers, the Resource Permutation Index bitmap can be used for frequency selective scheduling.

In some embodiments, limits can be imposed on allocation sizes of permutations. For example, for a partition of 30 resources, there are 512 possible permutations of assigning resources. This results in a 9-bit binary bitfield to express all 512 permutations. If the partition of 30 resources has a maximum assignment is two resource blocks, there are 89 possible permutations for assigning the resource blocks. This results in a 7-bit binary bitfield to express all 89 permutations.

Table 1 shows a partition-to-permutation index mapping for a partition having 4 resource blocks allocated for data traffic. The "Partition divisions" column indicates the number of resource blocks assigned per user. For instance, "1,1,1,1" indicates that there are four separate users assigned one resource block each. This assignment is mapped to an index number "0" having a bitmap value "000". The assignment "1,1,2" indicates that there are three separate users, the first two are each assigned one resource block and the third user is assigned two resource blocks. This assignment is mapped to an index number "1" having a bitmap value "001". The remainder of the partition-to-permutation index mapping values in the "Partition divisions" column can be similarly defined.

TABLE 1

Permutations of Partitions for Four Resource Blocks

| Partition divisions (in resource blocks) | Index number | Bitmap value |
|---|---|---|
| 1, 1, 1, 1 | 0 | 000 |
| 1, 1, 2 | 1 | 001 |
| 1, 2, 1 | 2 | 010 |
| 2, 1, 1 | 3 | 011 |
| 3, 1 | 4 | 100 |
| 1, 3 | 5 | 101 |
| 2, 2 | 6 | 110 |
| 4 | 7 | 111 |

In some embodiments, the resource permutation index bitmap may be replaced by an allocation size bitmap. An allocation size bitmap has an entry for each assignment indicated by the assignment bitmap, the value of the entry maps to the size allocation. For example, a '0' may indicate 1 resource, and a "1" indicates 2 resources. In some embodiments, each entry has multiple bits so that several sizes can be indicated.

User Pairing or User Sets Combination Index Bitmap (Fixed or Determinable Length Bit Field)

In some embodiments, possibly for, but not limited to, collaborative MIMO for uplink transmission, pairs or sets of users can be dynamically selected for transmission on the same time-frequency resource. In collaborative MIMO two or more separate mobile stations share a transmission resource when communicating with a base station. In some embodiments, other MIMO methods, such as multi-user MIMO for DL transmission can be supported using these methods in the same manner.

Users with indicated assignments are combined into pairs, triples, quadruples, etc. and the bitmap indicates an index that corresponds to the combinations of pairs or sets of assigned users. In some embodiments, this allows selected multiple users to be assigned to the same resource for applications such as UL or DL MIMO.

In some embodiments, a pair or set of consecutively indicated assignment users from the same bitmap can use the same resource block(s). In some embodiments, such a feature and a number of users sharing the resource block(s) can be configured for the group. The configuration may be dynamically configurable or used for a longer-term.

In some embodiments, if sets of consecutive users are assigned to the same resource block(s), a scheduler may choose not to schedule some users in a given group in a given frame to allow certain pairings or sets of users to be scheduled on the same resource.

In some embodiments, the scheduler may choose to schedule multiple groups to the same resource to allow certain pairings or sets of user to be scheduled on the same resource.

In some embodiments, an index is sent in a bitmap to indicate which combinations of users, in pairs or sets, are intended. The index can map to an entry in a table of combinations of user pairs or users sets. In some embodiments, the index is sent for every occurrence of a given group signalling and hence, the combinations of user pairings or user sets may change dynamically.

In some embodiments, the bitmap appears only on bitmaps for users with relatively high geometry. Users that have high geometry are users that have good long-term channel conditions for communicating with their serving base station. Therefore, it is desirable in some situations to provide bitmaps for users with generally good channel conditions.

In some embodiments, the bitmap changes as a function of a number of resource assignments, which may be determinable by the user. In some embodiments, the bitfield may be over provisioned so that its length may be easily determined.

In some embodiments, size will be fixed for hypothesis detection of group. Alternatively, if there are no persistent assignments, size can be derived from partition size and may not be fixed.

In some embodiments, the length of the bitmap is large enough to signal the maximum number of user pairing or user set combinations possible in a given group of users.

In some embodiments the length of the bitmap can be fixed. In some embodiments, this field length may be known by the user, determinable by the user, or determinable to a set of possibilities by the user.

In some embodiments, the length of field is large enough to indicate each of the possible user pairing or user set combinations of K users with indicated assignments, where K is one of: the maximum number of assignments, determined by i) the size of the partition (from which resources for data can be derived or ii) the minimum assignment size; the size of a user set (either single, pairs, triples, etc.); the maximum number of assignments as given by the length of the assignment bitmap and the size of a user set (either single, pairs, triples, etc.); and the minimum of any of the above criteria.

In some embodiments where some resources of the partition are not available due to resources being persistently assigned, or otherwise unavailable, the length of the user pairing or user sets combination index bitmap, can be determined in the manner described above.

Table 2 shows a user combination-to-index mapping to indicate user assignments and considering only pairs of users, or otherwise referred to as sets of two. The "Users combinations" column indicates the pairs of users being considered. For instance, "1 and 2; 3 and 4" indicates that users 1 and 2 are grouped together as a pair and users 3 and 4 are grouped together. These combinations are mapped to an index number "0" having a bitmap value "000". The groupings and 3; 2 and 4" indicate that users 1 and 3 are grouped together as a pair and users 2 and 4 are grouped together. These combinations are mapped to an index number "1" having a bitmap value "001". The remainder of the combination-to-index mapping values in the "Users combinations" column can be similarly defined.

TABLE 2

4 Assignments, Sets of 2

| Users combinations (e.g. users numbered 1 through 4 in order of assignment in bitmap) | Index number | Bitmap |
|---|---|---|
| 1 and 2; 3 and 4 | 0 | 000 |
| 1 and 3; 2 and 4 | 1 | 001 |
| 1 and 4; 2 and 3 | 2 | 010 |
| Reserved field | 3 | 011 |

While Table 2 is an illustrative example for a small number of combinations for pairs of users, it is to be understood, that the same principle can be applied to larger numbers of users, and sets of those users, as opposed to only pairs, as shown in Table 2.

In another example, it can be seen that users are paired from multiple bitmaps. For instance, a 10 bit bitmap (with four indicated assignments) for low geometry (poor long term channel conditions) users is concatenated with an 8 bit bitmap (with two indicated assignments) for high geometry users to form an 18 bit bitmap with a total of six indicated assignments. As user sets of two are desired, the bitmap is divided into two partitions with approximately equal indicated assignments in each. In this case, the bitmap is divided such that each portion has three of the six indicated assignments.

Without additional ordering indication, the first indicated assignments from each bitmap partition (i.e. first and fourth indicated assignments from the concatenated 18 bit bitmap are paired together on a first resource. The second indicated assignments from each partition are paired together for assignment on a second resource, etc.

Hence the users assigned to the three resources, denoted by the order of indicated assignment in the concentrated bitmap are: 1 and 4; 2 and 5; 3 and 6.

TABLE 3

User sets combination index: 6 assignments, sets of 2

| Users combinations (Users numbered 1 through 6 in order of indicated assignment in bitmap) {first resource, second resource, third resource} | Index number | Index bitfield |
|---|---|---|
| 1 and 2, 3 and 4, 5 and 6, | 0 | 0000 |
| 1 and 2, 3 and 5, 4 and 6, | 1 | 0001 |
| 1 and 2, 3 and 6, 4 and 5, | 2 | 0010 |
| 1 and 3, 2 and 4, 5 and 6, | 3 | 0011 |
| 1 and 3, 2 and 5, 4 and 6, | 4 | 0100 |
| 1 and 3, 3 and 6, 4 and 5, | 5 | 0101 |
| 1 and 4, 2 and 3, 5 and 6, | 6 | 0110 |
| 1 and 4, 2 and 5, 3 and 6, | 7 | 0111 |
| 1 and 4, 2 and 6, 3 and 5, | 8 | 1000 |
| 1 and 5, 2 and 3, 4 and 6, | 9 | 1001 |
| 1 and 5, 2 and 4, 3 and 6, | 10 | 1010 |
| 1 and 5, 2 and 6, 3 and 4, | 11 | 1011 |
| 1 and 6, 2 and 3, 4 and 5, | 12 | 1100 |
| 1 and 6, 2 and 4, 3 and 5, | 13 | 1101 |
| 1 and 6, 2 and 5, 3 and 4, | 14 | 1110 |
| Reserved | 15 | 1111 |

Alternatively, ordering can be specified for one or more of the partitions. A user set combination index can be used with a user set size of 1 to effectively change the order of the indicated assignments for one of the partitions. In such an implementation, a user set combination index can be appended to the concatenated 18 bit bitmap to specify the ordering of the first partition indicated assignments.

TABLE 4

3 Assignments, sets of 1

| User combinations | Index Number | Index bitfield |
|---|---|---|
| 1, 2, 3 | 0 | 000 |
| 1, 3, 2 | 1 | 001 |
| 2, 1, 3 | 2 | 010 |
| 2, 3, 1 | 3 | 011 |
| 3, 1, 2 | 4 | 100 |
| 3, 2, 1 | 5 | 101 |
|  | 6 | 110 |
|  | 7 | 111 |

For example, Table 4 may be used to relate a sent index bitfield with an ordering of the first partition's assignments. If "011" is sent, the order of indicated assignments in the bitmap 1,2,3 are ordered to 2,3,1 for the pairing process.

Hence the users assigned to the 3 resources, denoted by the order of indicated assignment in the concentrated bitmap are: 2 and 4; 3 and 5; 1 and 6;

In some embodiments, different organization of sets, some of which may require larger bitmaps, are possible, and can be specified by this bitmap including, but not limited to, ordering of sets of users and/or positioning of sets of users.

In some embodiments, the User Pairing or User Sets Combination Index Bitmap may be omitted and a predefined user set technique is used instead to identify user pairs and/or sets. For example, a group bitmap may be configured so that consecutive pairs of users with assignment indications are assigned to the same resource. For example, user 1 and user 2 are assigned the first available resource block, user 3 and user 4 are assigned the second available resource block.

In some embodiments, a user set may be of "size 1", meaning the set is only for an individual user, so that the user pairing or user sets combination index bitmap specifies the individual allocation order of the users. In a particular example, there are four assignments indicated by the assignment bitmap, and they are ordered for users 1, 2, 3 and 4. There are 24 ways to order these four users. A 5-bit field (enabling a maximum of 32 different values) could be used to signal each of these 24 possibilities, as needed.

In some embodiments, the bitmap can be used to arrange users in a desired order. In some embodiments, the bitmap can be used for frequency selective scheduling.

In some embodiment's power efficiency and flexibility of transmission may be improved by using smaller group sizes so that users may be further subdivided into groups to lower group sizes and/or hypothesis detection of group bitmaps. Power efficiency and flexibility of transmission may be improved by using hypothesis detection of group bitmaps as it allows bitmaps to be sent at variable times, with variable sizes and/or in variable locations.

When allocated resources are non-persistent, the bitmap sizes should be known. When persistent assignments are used, the bitmaps can be over provisioned so that the length of the bitmap may be more easily determined. The bitmap length of the bitmap may be more easily determined because if the bitmap is overprovisioned to have a maximum allowable length, the length of the bitmap is at least determinable, enabling it to be decoded correctly.

In some embodiments, a group's resources are multiplexed via a combination index. This can be the 'main' combination index bitmap, or an additional bitmap within the 'group assignment zone'.

It is also possible to use multiple groups in a partition, where group resources are multiplexed by other methods. In some embodiments this may include providing an indication of resources used by other bitmaps, for example, but not limited to, a resource availability bitmap or a reserved resource header. In some embodiments this may include a user reading multiple bitmaps, its own bitmap and other group's bitmaps, to determine the location of the user's assignment.

Group Bitmap Functioning

Reference will now be made to the examples of FIGS. 4 to 7 that described the use of the resource permutation index and user pairing or user set combination index. Also discussed are examples of determining a minimum bit length of these particular bitmaps.

In the following examples, the minimum assignment size is one resource block. In some implementations this may be a single BCU.

In the following examples, a size of the resource availability bitmap, if present, may be determined from the partition size. As described above, the size of resources used for signalling may have to be calculated and removed from the partition size.

In the following examples, the size of the assignment bitmap can be determined from a message sent to users when the users join a respective group, or when parameters are changed, or at some other desired time.

Presence of the resource availability bitmap can be determined, for example, based upon whether a partition location is in a "persistent zone" or a "non-persistent zone" of a time-frequency resource. The resource availability bitmap will be present in the "persistent zone", but will not be present in the "non-persistent zone".

Figure 4:
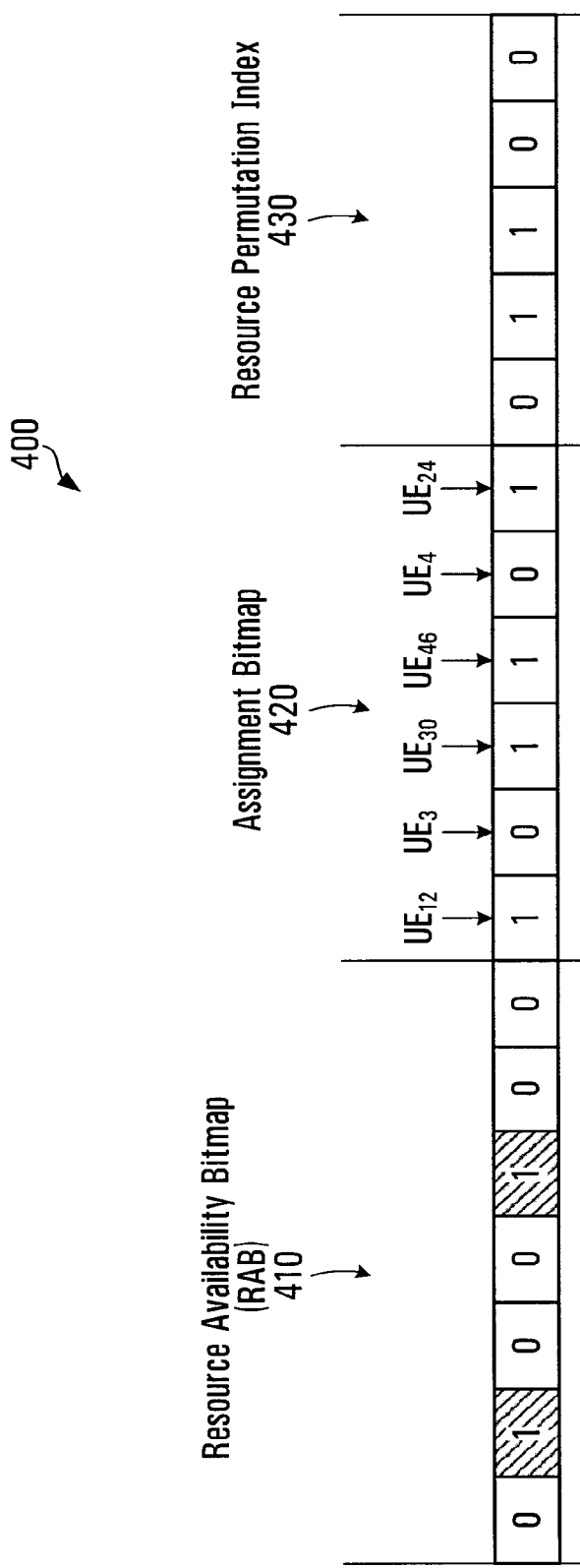
FIG. 4 is a schematic diagram of a group signalling bitmap configuration with a resource availability bitmap, an assignment bitmap and a resource permutation bitfield according to an embodiment of the invention.

FIG. 4 illustrates a group signalling bitmap configuration 400 including a resource availability bitmap (RAB) 410, an assignment bitmap 420 and a resource permutation index bitmap 430. The RAB 410 has 7 bits, one bit corresponding to each assigned resource to indicate its availability. The "1" value in bit locations 2 and 5 (counting from left to right) indicate that the resource assignments are not available, while the "0" value in bit locations 1, 3, 4, 6 and 7 indicate that the resource assignments are available. The assignment bitmap 420 has 6 bits, one bit for possible assignment to each user. The "1" value in bit locations 1, 3, 4 and 6 of assignment bitmap 420 indicate that users $UE_{12}$, $UE_{30}$, $UE_{46}$ and $UE_{24}$ are assigned a resource and the "0" value in bit locations 2 and 5 indicate that users $UE_3$ and $UE_4$ are not assigned a resource. The resource permutation bitmap 430 has 5 bits.

A partition size for FIG. 4, defined in resource blocks, is X=7+any resources used for signalling. The length of the bitmap used for signalling is determined by: Length=CRC size (predefined fixed number of bits)+Resource availability bitmap size (7 bits, one for each resource block)+assignment bitmap size (6 bits)+resource permutation field bitmap size (5 bits).

Using the procedure described previously, the length of the resource permutation index bitmap can be determined by the maximum number of partitions given X assignments.

In some embodiments, the length of the resource permutation index bitmap is large enough to indicate for each of the possible partitions having X resource blocks, where X is one of:

the maximum number of assignments, determined by either i) the size of the partition (from which resources for data can be derived) or ii) the minimum assignment size;

the maximum number of assignments as given by the length of the assignment bitmap; and the minimum value of any of the above criteria.

With regard to FIG. 4, the maximum number of assignments, determined by the size of the partition for group traffic, is equal to 7 as the number of partitions for group traffic equals 7 and the minimum assignment size is 1 resource per partition.

However, the maximum number of assignments determined by the minimum assignment size, is given by the bit length of the assignment bitmap. This bit length of the assignment bitmap is only 6, allowing one possible assignment for each user.

As a result, the resource permutation index bitmap needs to specify the permutations of 6 resources into partitions. There are 32 way to divide 6 resources into the partitions, and hence the bitmap size is 5 bits.

In the example of FIG. 4, the bitmap "01100" in resource permutation index bitmap 430 is an index, for example from a permutation lookup table similar in format to Table 1 above, that corresponds to a partitioning of "1,1,2,1", which indicates that $UE_{12}$, $UE_{30}$, and $UE_{24}$ have 1 resource each, and $UE_{46}$ is assigned 2 resources.

In some embodiments where some resources of the partition are not available due to being assigned persistently or otherwise unavailable, the length of the resource permutation bitmap is determined as in the manner described above.

Figure 5:
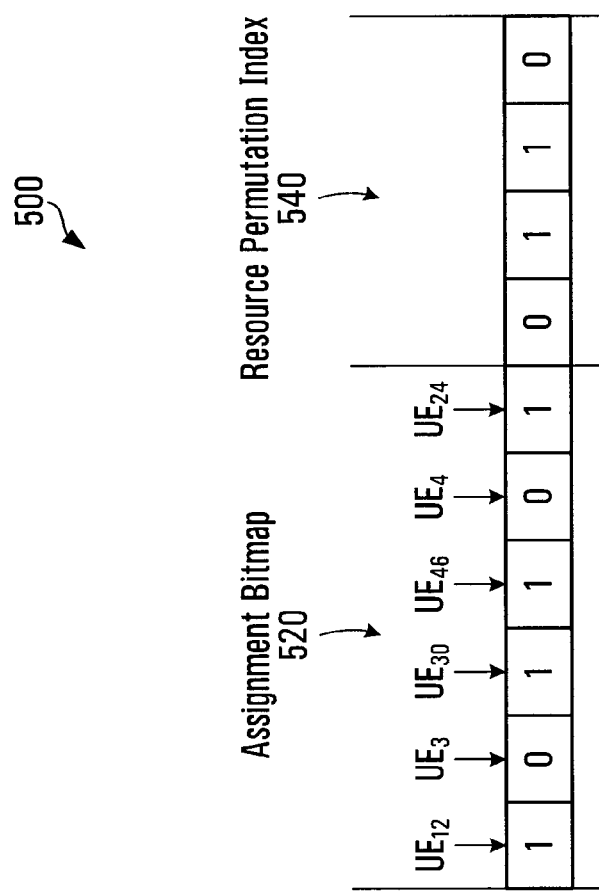
FIG. 5 is a schematic diagram of a group signalling bitmap configuration with an assignment bitmap and resource permutation bitmap according to an embodiment of the invention.

FIG. 5 illustrates a group signalling bitmap configuration 500 including an assignment bitmap 520 and a resource permutation index bitmap 540. The assignment bitmap 520 has the same configuration as in FIG. 4. The resource permutation bitmap 540 has only 4 bits.

A partition size, defined in resource blocks, is X=5+any resources for signalling. The length of the bitmap is determined by: Length=CRC size (predefined fixed number of bits)+assignment bitmap size (6 bits)+resource permutation index bitmap size (4 bits).

Using the procedure described previously, the length of resource permutation field can be found by the maximum number of partitions given X assignments, where X is the maximum number of assignments. With regard to FIG. 5, the maximum number of assignments, determined by the size of the partition for group traffic is equal to 5, as the number of partitions for group traffic equals 5 and the minimum assignment size is 1 resource per partition.

However, the maximum number of assignments, determined by the minimum assignment size as given by the length of the assignment bitmap is 6, as there are only 6 bits, one possible assignment for each user.

As a result, the resource permutation index bitmap needs to specify combinations of 5 resources into partitions. There are 15 possible ways to divide 5 resources into partitions, and hence the bitmap is 4 bits.

In the example of FIG. 5, the bitmap "0110" in resource permutation index 540 is an index, for example from a permutation lookup table similar in format to Table 1 above, that corresponds to a partitioning of "1,1,2,1", which indicates that $UE_{12}$, $UE_{30}$, and $UE_{24}$ have 1 resource each, and $UE_{46}$ is assigned 2 resources.

Figure 6:
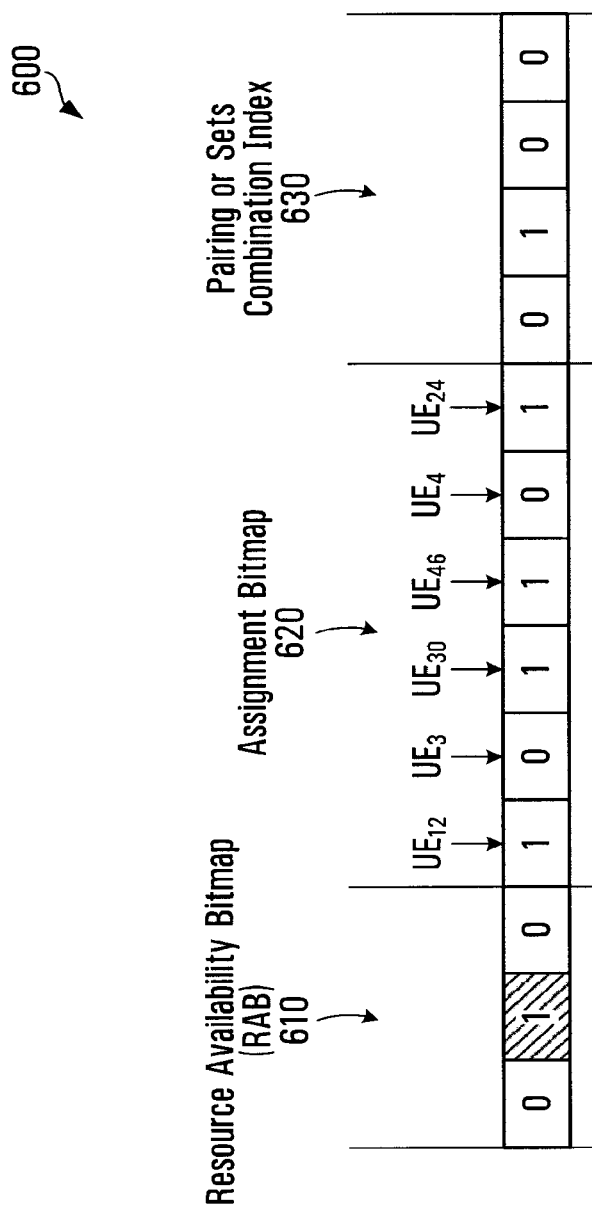
FIG. 6 is a schematic diagram of a group signalling bitmap configuration with a resource availability bitmap, an assignment bitmap and a user pairing or user sets combination index field according to an embodiment of the invention.

FIG. 6 illustrates a group signalling bitmap configuration 600 including a resource availability bitmap (RAB) 610, an assignment bitmap 620 and a users pairing or sets combination index bitmap 630. The RAB 610 has 3 bits, one bit corresponding to each assigned resource to indicate its availability. The "1" value in bit location 2 indicates that the resource assignment is not available, while the "0" value in bit locations 1 and 3 indicates that the resource assignments are available. The assignment bitmap 620 has a similar format as the assignment bitmap 420 in FIG. 4. The users pairing or sets combination index bitmap 630 has 4 bits.

A partition size, defined in resource elements, is X=3+any resources for signalling. The group is configured to allow pairs of users to share an indicated resource, for example UL collaborative MIMO. The length of the bitmap is determined by: Length=CRC size (predefined fixed number of bits)+ Resource availability bitmap size (3 bits)+assignment bitmap size (6 bits)+user pairing or sets combination index bitmap size (4 bits).

Using the procedure described previously, the length of user pairing or sets combination index field can be found by the maximum number of partitions given X assignments, where X is the maximum number of assignments. With regard to FIG. 6, the maximum number of assignments, determined by the size of the partition for group traffic is equal to 6, as the number of partitions for group traffic equals 3 and the minimum assignment size is 1 resource per partition, but there are two UEs per resource, so there are 2 resources per partition.

The maximum number of assignments, determined by the minimum assignment size as given by the length of the assignment bitmap is 6, as there are 6 bits.

As a result, the user pairing or sets index bitmap needs to specify combinations of 6 resources into partitions. There are 15 possible ways to divide 5 resources into partitions, and hence the bitmap is 4 bits in length.

In the example of FIG. 6, the bitmap "0100" in user pairing or sets index bitmap 630 is an index, for example from a combination lookup table similar in format to Table 2 above, that corresponds to a partitioning of "pairing 1 with 3 and 2 with 4", thus $UE_{12}$, and $UE_{46}$ are assigned the first resource, and $UE_{24}$ and $UE_{30}$ are assigned the third resource, which is the second resource available, as the second resource is indicated not to be available in the resource availability bitmap 610.

Figure 7:
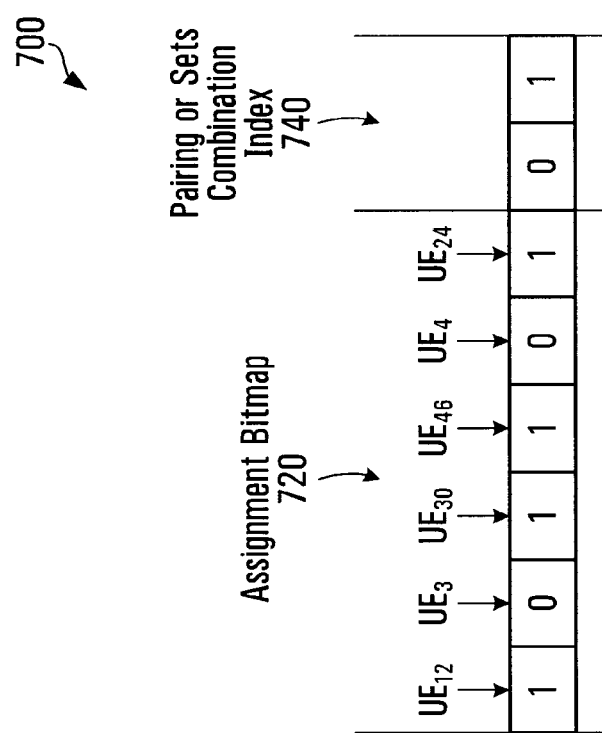
FIG. 7 is a schematic diagram of a group signalling bitmap configuration with an assignment bitmap and a user pairing or user sets combination index field according to an embodiment of the invention.

FIG. 7 illustrates a portion of a group signalling bitmap configuration including an assignment bitmap 720 and a user pairing or sets index bitmap 740. The assignment bitmap 720 has the same configuration as in FIG. 6. The resource permutation bitmap 740 has only 2 bits.

A partition size, defined in resource elements, is X=2+any resources for signalling. The group is configured to allow pairs of users to share an indicated resource. The length of the bitmap is determined by: Length=CRC size (predefined fixed number of bits)+assignment bitmap size (6 bits)+ resource permutation index bitmap size (2 bits).

Using the procedure described previously, the length of resource permutation field can be found by the maximum number of partitions given X assignments, where X is the maximum number of assignments. With regard to FIG. 7, the maximum number of assignments, determined by the size of the partition for group traffic is equal to 4, as the number of partitions for group traffic equals 2 and the minimum assignment size is 1 resource per partition, but there are two UEs per resource, so there are 2 resources per partition.

However, the maximum number of assignments, determined by the minimum assignment size as given by the length of the assignment bitmap is 6, as there are 6 bits.

As a result, the user pairing or sets index bitmap needs to specify combinations of 4 resources into partitions. There are 3 possible ways to divide 4 resources into partitions, and hence the bitmap is 2 bits in length.

In the example of FIG. 7, the bitmap "01" in user pairing or sets index bitmap 740 is an index, for example from a user pairing or sets combination lookup table similar in format to Table 2 above, that corresponds to a partitioning of "Pairing 1 with 3 and 2 with 4", thus $UE_{12}$, and $UE_{46}$ are assigned the first resource, and $UE_{24}$ and $UE_m$ are assigned the second resource.

In some embodiments, the pairing or user set combination index bitmap can be used together with a resource permutation index bitmap as part of the resource allocation signalling.

In some embodiments, the length can be expressed as Length=Assignment bitmap bits (# of users positions in group, does not change dynamically)+# of bits from assignment-dependent field length (and/or fixed fields)+CRC.

In some embodiments, if there are persistent assignments, and when from an indication of the partition size, or when derived from the partition size, the number of assigned resources to a group are known, the resource availability bitmap field length is known. An exact number of assignments may not known, but can be over provisioned for a given resource partition size. Alternatively, in some embodiments, the number of assignments can be fixed.

In some embodiments, the length can be expressed as Length=resource partition size dependent field(s)+Assignment bitmap bits (# of users in group, does not change dynamically)+# of bits from assignment-dependent field length over provisioned (and/or fixed fields)+CRC bits.

In some embodiments persistent assignments may be allowed to span a designated resource space, which may be all of the resource space. The indication of what resources are assigned to persistent users (and in use) can occur by the following methods.

In some embodiments, when supporting persistent assignments, combination index signalling, such as that described in commonly owned patent application Ser. No. 12/202,741 filed Sep. 2, 2008 may be used to provide an indication of what resources are in use.

In some embodiments, at least one RAB is used per partition, each transmitted to a target user of a respective partition. This is referred to herein as a distributed RAB approach in which each partition has its own RAB. Such an approach may be used for group and non-group partitions. If a combination index partition structure is used, the combination index partitions are calculated including persistent assignment resources, so users can subtract assignments from their allocation.

In some embodiments, an indication of all persistent assignments across the entire resource can be provided with the resource availability bitmap (RAB) and broadcast to all users who require it. This is referred to herein as a central RAB approach in which there is a single RAB located prior to the various partitions (and/or zones that may define persistent and non-persistent zones) of a frame that define the resource availability for each of the partitions.

In some embodiments the time-frequency resource is divided into two zones, one zone which is designated to allow persistent assignment (persistent zone), and the other zone that does not allow persistent assignment (non-persistent zone). One or more of or each of these zones may be present. Furthermore, the zones need not be physically contiguous resources, but rather a collection of one or more logical resources.

In some embodiments, signalling within the persistent zone makes use of a previously described indication of persistently allocated resources that are in use. Signalling within the non-persistent zone does not require an indication of persistent assignments.

In some embodiments, using at least one RAB per partition in the persistent zone, it can be determined whether or not an RAB is present in the signalling by determination of a zone type of the assignment. In implementations where resource partitions are indicated, the location of the traffic partition can determine whether an RAB is present in the associated signalling message for a given partition.

Figure 8:
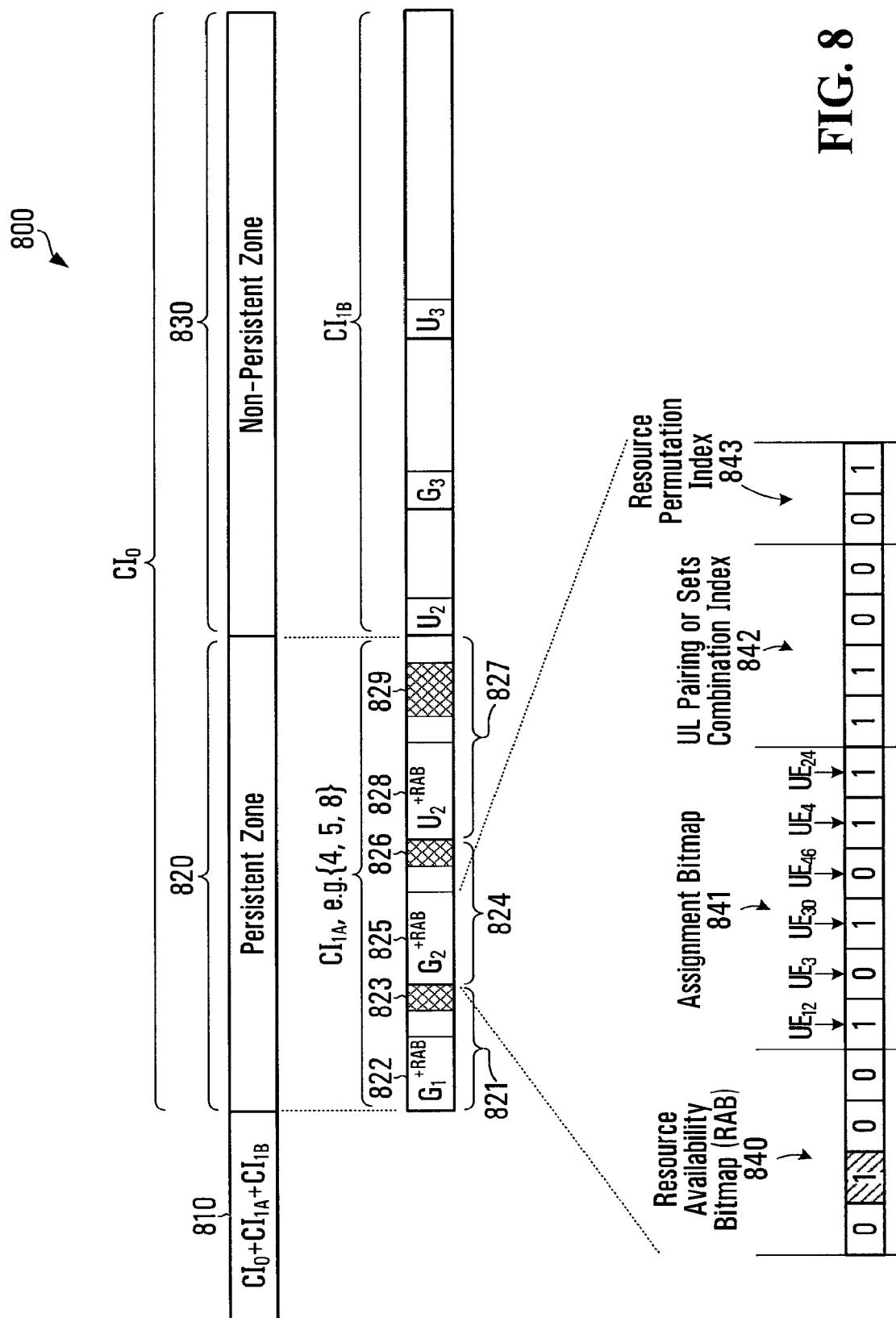
FIG. 8 is a schematic diagram of an example of a distributed resource availability bitmap in which group and unicast resource allocations can coexist according to an embodiment of the invention.
Figure 9:
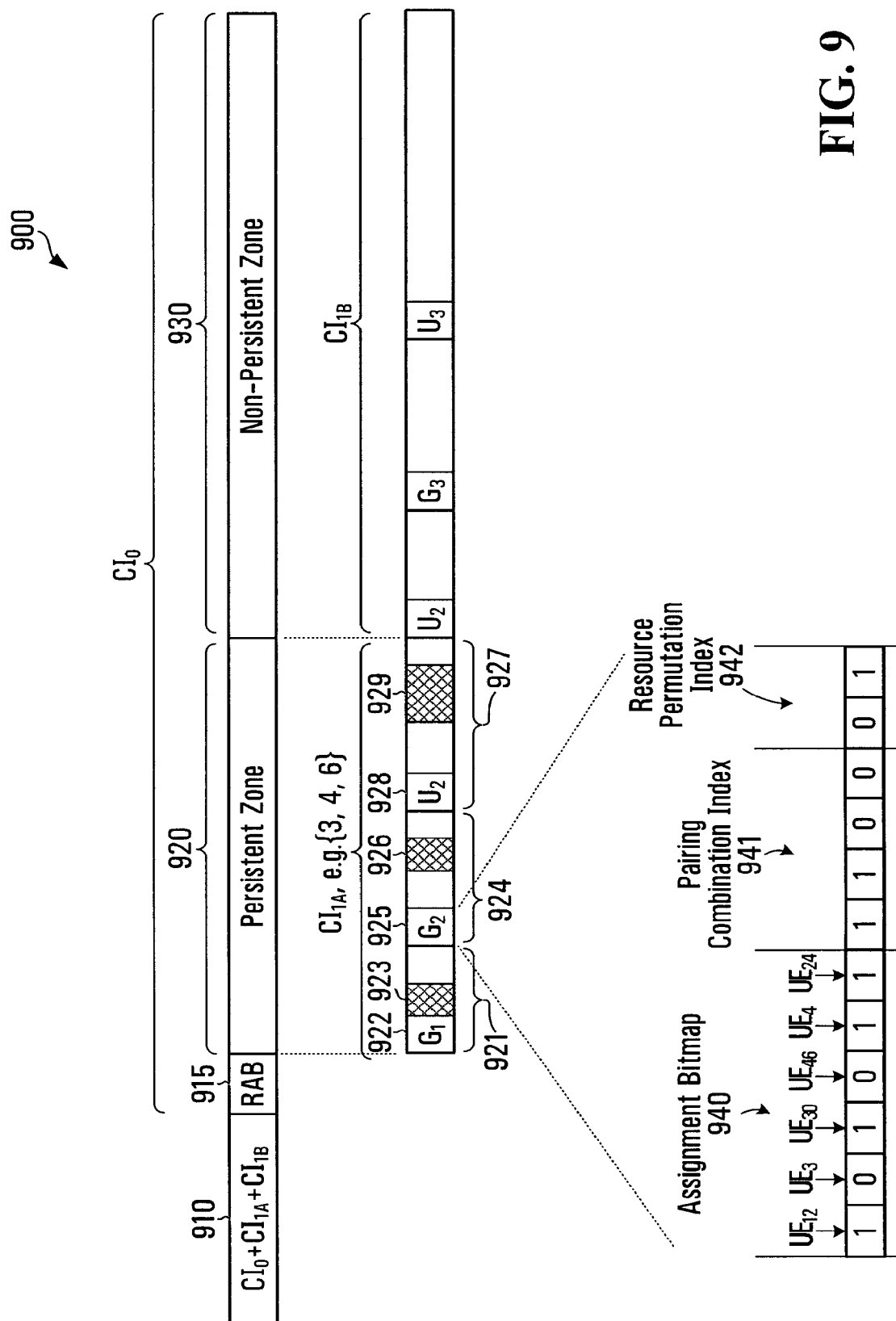
FIG. 9 is a schematic diagram of an example of a central resource availability bitmap in which group and unicast allocations can coexist according to an embodiment of the invention.

Reference will now be made to FIGS. 8 and 9 when describing example implementations of using a distributed RAB approach and centralized RAB approach.

FIG. 8 illustrates an implementation using a distributed RAB. In the illustrated example one or both of group and unicast resource allocations may be included in the frame.

FIG. 8 illustrates at least part of a time-frequency resource 800, having a combination index 810, a persistent zone 820 that has at least some resources that are persistently assigned, and a non-persistent zone 830 that has no persistently assigned resources. The time-frequency resource may be a frame or sub-frame, depending on which particular telecommunication standard the described method is applied. In the persistent zone there are three partitions 821, 824, 827. Two of the partitions 821, 824 are group assignments and have signalling bitmaps 822, 825, respectively, which may be of a type described in detail above. The third assignment 827 is a unicast assignment and has a signalling bitmap 828.

The combination index 810 may be a resource availability index used in defining a control channel such as that described in commonly owned patent application Ser. No. 12/202,741 filed Sep. 2, 2008. The combination index 810 may be used to define the resources used for the various partitions in both the persistent zone 820 and the non-persistent zone 830.

With reference to group assignment 824, group assignment 824 has a signalling bitmap 825 that includes a resource availability bitmap (RAB) 840, an assignment bitmap 841, a pairing or sets combination index bitmap 842 and a resource permutation index bitmap 843. The RAB 840 has 4 bits, one bit corresponding to each assigned resource to indicate its availability. The "1" value in bit location 2 indicates that the resource assignment is not available, while the "0" value in bit locations 1, 3 and 4 indicates that the resource assignments are available. The assignment bitmap 841 has 6 bits, one bit for possible assignment to each user. The "1" value in bit locations 1, 3, 5 and 6 of assignment bitmap 841 indicate that users $UE_{12}$, $UE_{30}$, $UE_4$ and $UE_{24}$ are assigned a resource and the "0" value in bit locations 2 and 4 indicate that users $UE_3$ and $UE_{46}$ are not assigned a resource. The pairing or sets combination index bitmap 842 has 4 bits. The resource permutation bitmap 843 has 2 bits. Group assignment 821 has a signalling bitmap as well.

In group assignment 824 also indicated is a persistently assigned resource 826 (gray shaded portion of group assignment 824) that is in use and as such is not available for assignment to other users. This may, for example, be the resource that is indicated to be unavailable in RAB 840. Similar persistent assignments are shown in group assignments 821 and 827.

In the illustrated example a single resource block is used for bitmap signalling in each partition.

In some embodiments, re-transmissions for unicast assignments are jointly signalled in a retransmission-specific partition within the non-persistent zone 830. If there is no non-persistent zone in a given frame, a partition in the persistent zone 820 may be used for re-transmissions. In some embodiments, re-transmissions for unicast assignments are separately signalled transmissions by unicast messages.

In some embodiments, persistent assignments are signalled by a unicast assignment message. This may occur, for example, once per talk spurt.

In some embodiments, in the persistent zone, the combination index partition does include persistent assignments. This means that for the persistent zone, persistent assigned resources that are "in use" are removed from the list of available resources. The combination index indicates the partitioning of the available resources after the persistently assigned "in use" resources have been removed.

FIG. 9 illustrates an implementation using a central RAB. In the illustrated example one or both of group and unicast resource allocations may be included in the frame.

FIG. 9 illustrates at least part of a frame 900, having a combination index 910, an RAB 915, a persistent zone 920 that has at least some resources that are persistently assigned, and a non-persistent zone 930 that has no persistently assigned resources. In the persistent zone there are three partitions 921, 924, 927. Two of the partitions 921, 924 are group assignments and have signalling bitmaps 922, 925, respectively, which may be of a type described in detail above. The third assignment 927 is a unicast assignment and has a signalling bitmap 928.

The combination index 910 may be a similar resource allocation index described above in FIG. 8. The combination index 910 and the RAB 915 may together be referred to as a multicast control segment (MCCS).

With reference to group assignment 924, group assignment 924 has a signalling bitmap 925 that includes an assignment bitmap 940, a pairing or sets combination index bitmap 941 and a resource permutation index bitmap 942. The assignment bitmap 940 has 6 bits, one bit for possible assignment to each user. In the illustrated example, the assignment bitmap 940 is similar to the assignment bitmap 841 in FIG. 8. The pairing or sets combination index bitmap w41 has 4 bits. The resource permutation bitmap 942 has 2 bits. Group assignment 921 has a signalling bitmap as well.

In group assignment 924 also indicated is a persistently assigned resource 926 (gray shaded portion of group assignment 924) that is in use and as such is not available for assignment to other users. Similar persistent assignments are shown in group assignments 921 and 927.

The following is an example for UL collaborative MIMO in which a resource allocation signalling bitmap size is determined.

In order for hypothesis detection of a bitmap to operate, a bitmap length (and in some cases its component fields) size can be: known to a user; determinable by the user; or determinable to a set of possibilities to the user. In some embodiments, as bitmap size may be related to a number of resource assignments in a non-persistent partition, bitmap size may be determined from knowing a number of resource blocks in a partition and the fixed number of resource blocks per user assignment.

In some embodiments, the bitmap length is dependent on another parameter such as a number of assignments, and hence the bitmap length can be determined by using this parameter. In some embodiments the parameter upon which the signalling length is dependent is determinable to a set of possibilities. In some embodiments the signalling message length is known to a finite set of possibilities. When the parameter upon which the signalling length is dependent is determinable to a set of possibilities it may be possible to perform one or both of the following actions to determine the length: use hypothesis detection to try different possibilities; and use predefined rules to eliminate all but one possibility.

By way of example, in a particular implementation, a partition is specified as having 7 resource blocks. If resource allocation signalling uses 1 resource block then there are 6 resource blocks left for data assignment, and the bitmap length can be determined to be "A" bits. If the resource allocation signalling uses 2 resource blocks then there are 5 resource blocks left for data assignment and the bitmap size can be determined to be "B" bits. In the particular example, it is determined that 3 resource blocks cannot be used for signalling due to configuration parameters (i.e. maximum resources, possible MCS levels, etc.). Hypotheses detection may be used to try both possibilities (bit length "A" and 1 resource block, and bit length "B" and 2 resource blocks), or a known rule may be used to uniquely determine the bit length.

An example of a known rule may be not using signalling assignments of 1 resource block when the bit length is greater than "C". Hence, if "A">"C", than the length is "B" and 2 resources are used, and "A"<"C", only 1 resource is used for the signalling assignment.

In some embodiments, the resource partition size is assumed known. If the group signalling uses resource partitions of the known size, the portion of partition used for data assignment may be assumed to be determinable given the methods described.

In some embodiments, the signalling may be superpositioned with traffic, and hence does not take bandwidth resources from the partition. The description and examples herein refer to "partition size", and it is taken that the size of partition for data or traffic, excluding resources for signalling, is either explicitly indicated or can be derived from the indicated partition size.

In some embodiments, the group bitmap's total length may be variable, but can be dynamically determined by the users in the group. The size may be: known by the users; determinable by the users; and/or determinable to a set of possibilities by the users.

In some embodiments, a user that has been assigned a group ID may try to decode the start of each partition with its group ID in an attempt to find the group resource assignment for the user.

In some embodiments, a user that has been assigned a group ID may try to decode a known location, not necessarily the start of each partition, with its group ID in an attempt to find the group resource assignment for the user.

In some embodiments, group or unicast signalling is multiplexed with traffic using several methods including: placing signalling at the beginning of the partition; superpositioning of the signalling and data; reserving one or more resource blocks at the beginning of the partition for signalling.

In some embodiments, the length of the field may be related to the indicated partition size (either directly, derived from or through over provisioning) for some range of sizes, and may be fixed for others. In some embodiments, the interpretation of these fixed fields may be predefined according to the number of assignments, possibly by subdividing the assignments into smaller groups.

In general, field size will be fixed based on bitmap size (number of users). In general, a smaller bitmap can be used. In some implementations, depending on the number of assignments, computational logic can be used to derive pairs from the bitmap.

For example, for a bitmap size appropriate for 20 users with fixed pairing indication of 10 bits, if there are 10 or less indicated assignments, the indication is the full combination index. If there are 11 to 12 indicated assignments, the field has two 4-bit fields for each set of 6 assignments, and therefore 2 bits are zero padded. If there are 13 to 16 indicated assignments, the field has two 4-bit fields for each set of 6 assignments, and a 2-bit field for up to the last 4 assignments. If there are 17 to 20 assignments, the field has 5 2-bit fields for groups of 4 users each.

FIG. 10 illustrates an exemplary table of the number of combinations and the size of the associated combination bitmap used to indicate possible pairings of users for 4, 6, 10, 16 and 20 assignments for the group bitmap.

For supporting persistent assignments, be they first transmission or subsequent transmissions, combination index signalling may provide an indication of what resources are in use. There are several possibilities for providing such an indication.

In a first possibility, the indication may be that a given partition is for persistent assignment. The given partition is largely fixed in size. The partition includes signalling to allocate resources that are not being used to other users, for example if a persistent resource is temporarily not needed by the user it is assigned to. The other users may be VoIP users or other types of users. This possibility limits the number of persistent assignments.

In a second possibility, persistent assignments are allowed to span the whole resource space. Combination index partitions are calculated including persistent assignment resources, so users can subtract assignments from their allocation.

In some embodiments, the indication of what resources are assigned persistently to users, as well as if they are in use, occurs by using at least one RAB per partition, each transmitted to target users of each partition. This is shown in the distributed RAB approach of FIG. 8. Such an indication may apply to group and non-group partitions.

In some embodiments, the indication of what resources are assigned persistently to users, as well as if the resources are in use, occurs by an indication of all persistent assignments across the entire resource by using the resource availability bitmap, which is broadcast to all users. This is shown in the central RAB approach of FIG. 9.

In some embodiments, persistent resources within a group assignment are assigned in a similar manner. For example each group assignment may have an exclusive persistent assignment/reassignment bitmap. In some embodiments, deassignment is optional, because if no packet is successfully received, a time-out may occur.

The following is an example of how persistent data assignments are made in a zone of a frame, the zone having three partitions. In the zone, user(s) in a first partition are assigned two resource blocks for data, user(s) in second partition are assigned three resource blocks for data, and user(s) in a third partition are assigned five resource blocks for data.

In this example, one resource block is also reserved for signalling in each partition in addition to the resource blocks assigned for data.

The first and second partitions each have one additional resource block assigned persistently and in use. The third partition has two additional resource blocks assigned persistently and in use.

Therefore, combining the resource blocks assigned for data, the resource blocks assigned for signalling, and the resource blocks that are persistently assigned, results in the first partition being assigned four (4) resource blocks, the second partition being assigned five (5) resource blocks and the third partition being assigned eight (8) resource blocks. The combination index will be represented as, or will be a function of, an index value {4,5,8}, which indicates the number of resource blocks assigned to each respective partition.

In some embodiments, a permutation index may be used instead of a combination index. A permutation index is similar to a combination index, but every permutation of the resource assignments is represented, meaning that there may be significantly more representative index values, and consequently a larger number of bits are needed to represent all of the index values. However, if partitions are fairly large, or can be changed slightly, the combination index is sufficient.

In some embodiments, by including persistent assignments in the combination index a user does not need to know anything about persistent assignments in other partitions to determine its own allocation locations.

Two techniques can be used in order to signal the persistent assignments. In a first technique, a bitmap is broadcast to users of partitions 1, 2 and 3, the bitmap having a bit length equal to 17 bits (4+5+8), in which each bit of the bitmap indicates a free or a used resource. In a second technique, a bitmap is broadcast to user(s) in each partition (improve power efficiency). With respect to the example above, this would mean the first partition has a bitmap length equal to 4 bits, the second partition has bitmap length equal to 5 bits and the third partition has bitmap equal to length 8 bits. The two techniques are essentially illustrated in FIGS. 8 and 9.

In a particular example of persistent allocation for first transmissions and non-persistent for re-transmissions, since all users in the group have a first transmission in a same frame, a group bitmap does not need to be sent for the respective first transmissions.

For retransmissions, the group bitmap may include some of the following, depending on the application: a resource availability bitmap; a user assignment bitmap; a partition-dependent length resource permutation index; and a fixed length collaborative MIMO pairing index (on some higher geometry UL VoIP bitmaps).

The group bitmap length changes with the number of partitions, which is signalled so that bitmap size is always known.

In addition, in some embodiments, as the group bitmap is scrambled with a group ID, the group bitmap can be sent at any time.

While reference is made above in many of the examples to a partition-type assignment structure in which each partition includes partition specific bitmap signalling, concepts and methods described herein may be used with other types of signalling structures as well.

In some embodiments, placement of group signalling in specific partitions, and/or resource allocation using resource permutation index allows some frequency selective scheduling.

Real Time Services

For applications with traffic types having larger packets and for frequency selective scheduling, the following techniques may be used either alone or in combination:

User pair or user sets combination index bitmap and/or permutation index bitmap and/or unicast signalling for these traffic types; explicitly define re-transmission resources in order to be frequency selective; allow for any MIMO features supported in regular unicast messages; and optionally, use superposition of messages starting with the "first" resource of each traffic channel for that assignment.

For example, this may be implemented by a user reading a broadcast index message and then attempting to decode an assignment message overlaid on the traffic. Any interference cancellation techniques used for transmission should be reliable, as the assignment message and traffic are intended the same user.

In some embodiments, superposition of the signalling and traffic for that assignment can be used. The region of superposition can be a known region of the traffic channel resource, or possibly the entire resource.

An example of superposition of traffic and signalling involving resource partitions is as follows: a user reads and/or derives resource partition(s) from broadcast message or otherwise; and the user attempts to decode the message, possibly using its user ID, which may be a MACID, and then attempts to decode an assignment message overlaid on the traffic.

In some embodiments, interference cancellation can be used to remove the correctly decoded signalling from the traffic channel.

For applications with, but not limited to, distributed resource assignments and/or smaller packet allocations, the following techniques may be used either alone or in combination: group assignment bitmap structure included within resource partitions, possibly signalled by a combination/permutation index; dynamic detection of group signalling by hypothesis detection; using assigned group ID to attempt to decode each possible occurrence of group signalling in a frame.

Indication of Order of Allocation Dimensions

Allocation of resources may occur in one dimension first, and than one or more other dimensions. For example, a first dimension and a second dimension may be time and logical channels, respectively, with allocation proceeding in the time dimension first. Resources may be allocated in the time dimension first, by adding logical channels in consecutive OFDM symbols starting with the first resource in the first OFDM symbol. Once one resource in each OFDM symbols has been allocated, the next resource allocated is the second resource in the first time resource. This process can be followed for one large allocation, or more than one separate allocations.

In some cases, it is advantageous to define one order of allocation as a default direction of first allocation, but allow for indication that the order of allocation may be reserved. For example, allocation may be performed in the logical frequency channel dimension first, followed by allocation in the time dimension. The order can be reversed by signaling a reversal indicator, so that the allocation order can follow the time dimension first and then frequency dimension.

The reversal indicator can be a bitfield to indicate the order of allocating the dimensions of the transmission resource. If there are only two options, then a 1-bit indicator can be used.

This allocation order can be used in each partition of a zone or frame, or alternatively, different within each partition.

Examples of dimensions include logical channels, physical channels, OFDM symbols, slots, virtual channel, and spatial channels.

While OFDM is specifically referred to, it is to be understood that the described method of allocation could apply to other transmission formats.

Multiplexing of Multiple Sizes of Allocations

In some embodiments, allocations occupy resources that are contiguous, or, occupy resources that are consecutive in at least one dimension. For example, the allocations may be consecutive in order of logical channels or physical channels.

In some of these cases, allocations may be limited to one or more allocation sizes. Use of different allocation sizes results in resources being grouped into two or more groups, each group having a distinct allocation size. These groups of differing allocation sizes may be multiplexed in the same resource space. The groups may be multiplexed in at least one of the following ways: 1) for two groups, starting each group from opposite ends of the resource space; 2) each group is given boundaries of allocation space; 3) each group is assigned starting (or ending) points for allocation space; 4) allocation of each group in a different subzone; and 5) allocation of each group in a different interlace.

In some embodiments, these boundaries, or staring points, may be changed by signalling an indication of where a resource group should exist or start.

In some embodiments, these boundaries, or staring points, may be changed by signalling a re-allocation of at least one allocation of a group in order to shift the boundary or staring point. Changing the boundaries of some groups may result in boundaries of other group being changed.

In some cases, the groups to be multiplexed differ in one or more ways. For example, in the case of two or more group types being multiplexed: one or more groups may have fixed allocation sizes while one or more others are variable per allocation; one or more groups may use power control adaptation while one or more others may have a fixed power settings; one or more groups may use control signalling while one or more others may have data traffic; one or more groups may use one form of channelization (e.g. distributed in frequency) while one or more others may use another (e.g. localized in frequency).

Timing of Re-Occurring Allocation

A re-occurring or persistent assignment may be defined for a given allocation. In some cases, the allocation can be periodic. The location of the resources may also be constant, or known, for each occurrence.

In a particular example related to VoIP, in the uplink, a mobile may request allocation when a first VoIP packet is created after a silence frame, call start, etc. After a request for resources is received, a persistent reoccurring allocation may be granted. This is especially useful in VoIP applications. As VoIP UL packets are created periodically, the base station (BS) can derive a resource assignment in a reoccurring frame that will results in the shortest idle time of a packet at the UL, given constraints of resource availability and equipment capability. The reoccurring resource will begin for the Nth VoIP packet generated in this set, possibly as early as the $2^{nd}$ packet.

Figure 11:
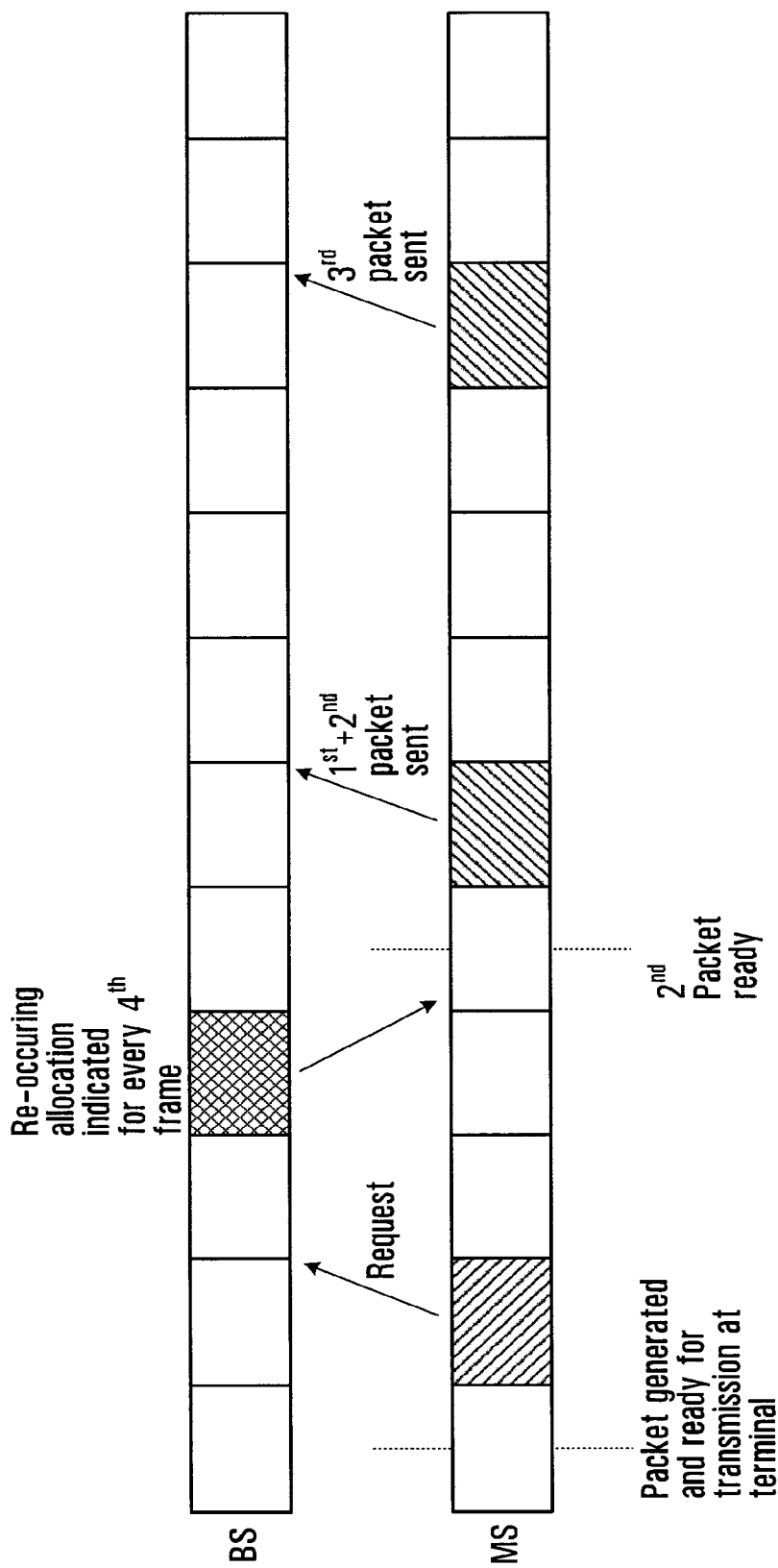
FIG. 11 is a schematic diagram illustrating the timing of a persistently assigned resource in which a first two packets are encoded together according to an embodiment of the present invention.

In some embodiments, the first packer that may have triggered the original request can be encoded with a second packet and transmitted on the reoccurring resource. This is illustrated in FIG. 11. One way to accommodate the combined first and second packets is to double the resource size for the combined first and second packet transmission. Another way to accommodate the combined first and second packets is to adjust the modulation and coding scheme (MCS) to allow use of the same resource size.

Figure 12:
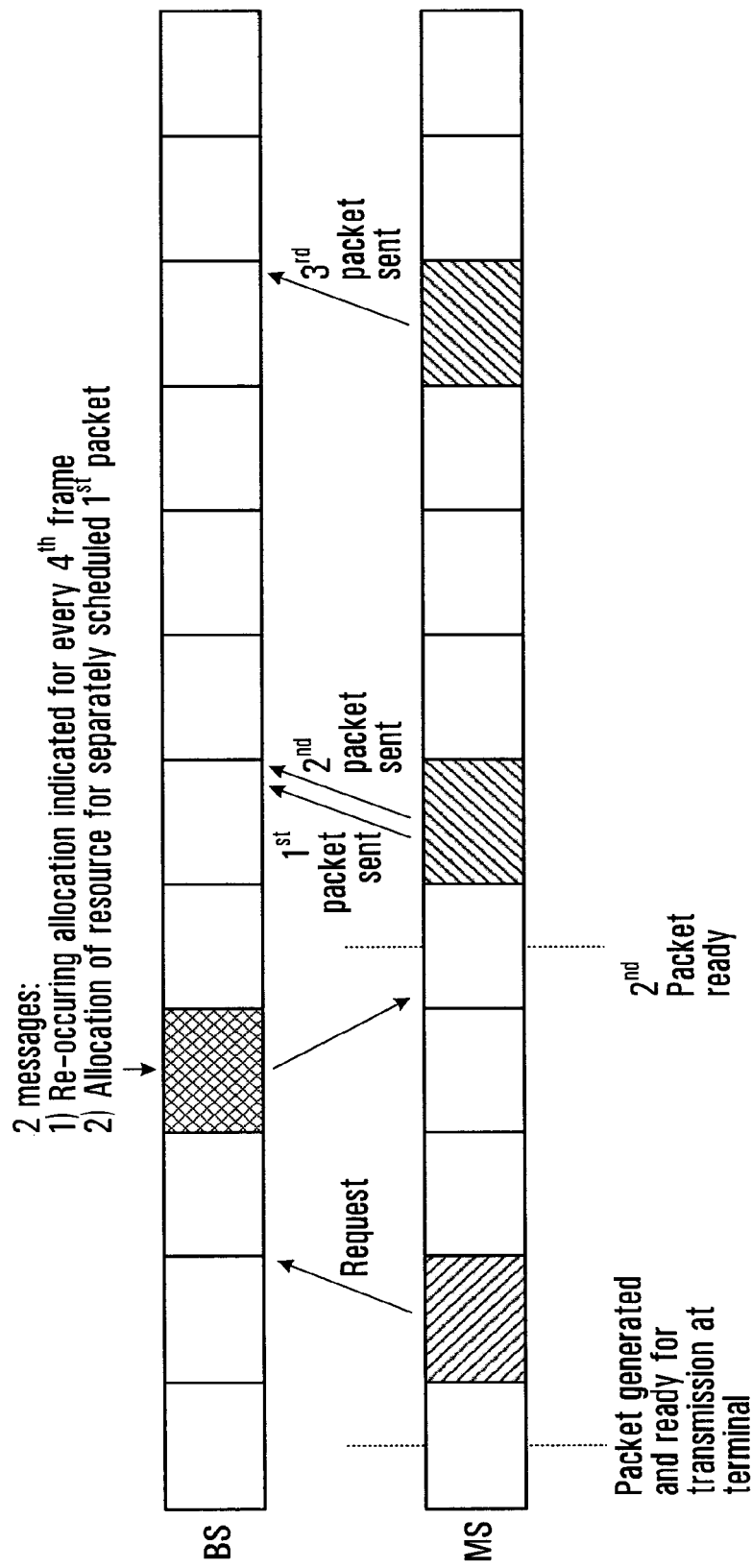
FIG. 12 is a schematic diagram illustrating the timing of a persistently assigned resource in which a first and second packet are sent separately according to an embodiment of the present invention.

In some embodiments, the first packet that may have triggered the original request can be scheduled separately from the re-occurring resource allocation. This is illustrated in FIG. 12. In some embodiments this is performed dynamically. In such a case, the request would cause two allocations. A first reoccurring resource to be allocated of the second packet and also a separate allocation for the first packet. These two allocations do not need to be in the same frame.

In some embodiments, the reoccurring resource may be used for only first re-transmissions of each packet.

While the above examples refer specifically to UL, the methods described may apply to a DL as well. In a DL implementation, the arrival of a first packet from a network triggers the "request for allocation".

In some embodiments, the procedure for transmission of the first packet can be known at both the base station and the mobile station. In other embodiments, it can be signaled within the re-occurring resource allocation or dynamically scheduled in the first transmission.

In some implementations, a bit field, equal to or greater than 1-bit, may be sufficient to indicate which option, combined first and second packets or separate first and second packets, will be used to transmit the first packet.

Supplemental Transmission Information Fields

In some continuous and/or real applications, users are singled via a group bitmap. Each location in the bitmap is assigned to a user. The value of the bit at the location for each user indicates whether the user is being assigned resources ('1'), or not being assigned resources ('0'). A first indicated assignment is assigned to a first available resource(s), the second indicated assignment is assigned to the second available resource(s) and so on. The available resources used for the group assignment may be indicated by a resource partition, or by some other form of assignment. In some embodiments, a resource availability bitmap may also be employed to indicate which specific resources are available.

In some implementations, users are divided into groups based on geometry or some other metric, with each group signaled by a bitmap, as descried in some detail above.

In some implementations, it may be desirable to add additional fields to the bitmap such as the user pairing or user sets combination index and resource allocation permutation index (each of which are discussed above in detail). Other additional bitmaps may include a bitmap that indicates if each assignment is an original sub-packet or a re-transmission sub-packet and an additional bitmap that indicates the MIMO mode of each assignment, each of which are described in further detail in PCT/CA2006/001738, which is herein incorporated by reference in its entirety.

In some embodiments, bitfields that modify, and/or provide additional information about each indicated assignment of the resource allocation bitmap are added to the resource allocation bitmap. A user, for example a mobile station, can use such information to derive resource allocations assigned to them, and as a result potentially reduce decoding hypotheses that may be used to decoding a location of the allocation. The bitfields are appended to the resource allocation bitmap, and the bitfields and resource allocation bitmap are encoded together.

Figure 13A:
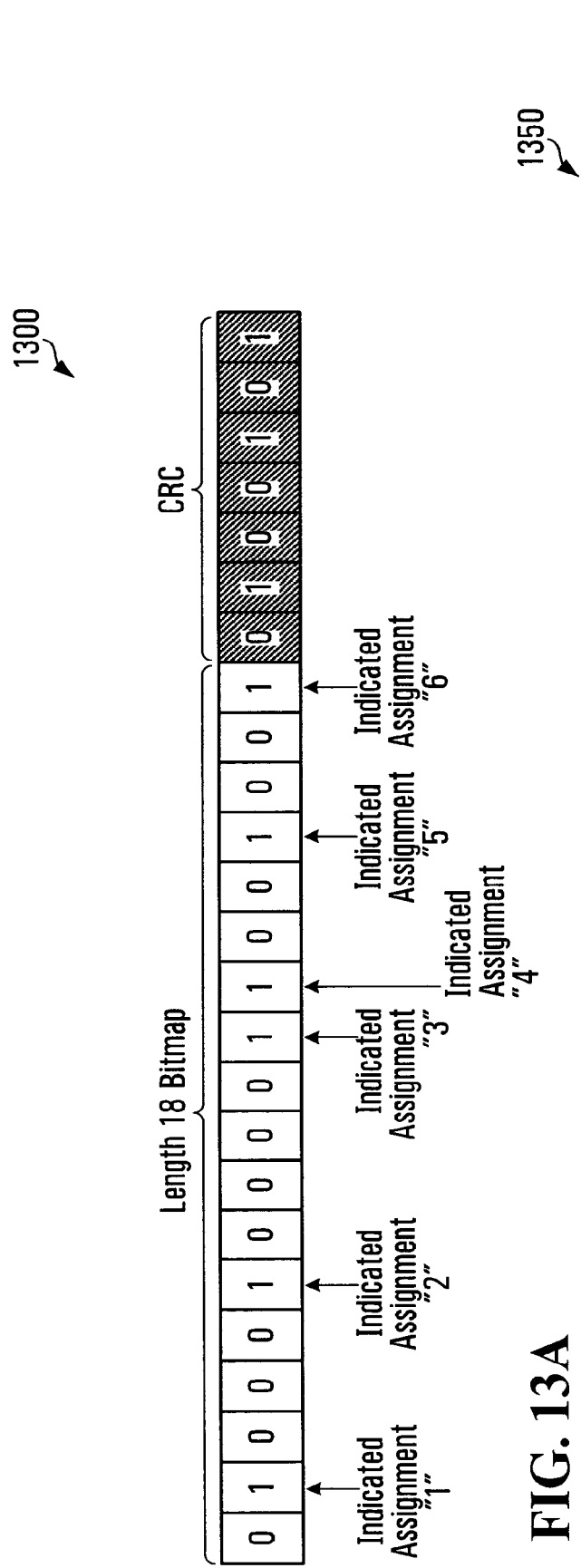
FIG. 13A is a schematic diagram of a group bitmap without a supplemental transmission information field.

FIG. 13A illustrates an example bitmap 1300 without supplemental transmission information bitfields. The bitmap 1300 has a length of 18 bits, which are use to indicated whether users associated with the bits are assigned a resource or not, and a 7 bit CRC. The "1"s in the bitmap 1300 indicate first, second, third, fourth, fifth and sixth assignments to the second, sixth, eleventh, twelfth, fifteenth and eighteenth users, respectively.

Figure 13B:
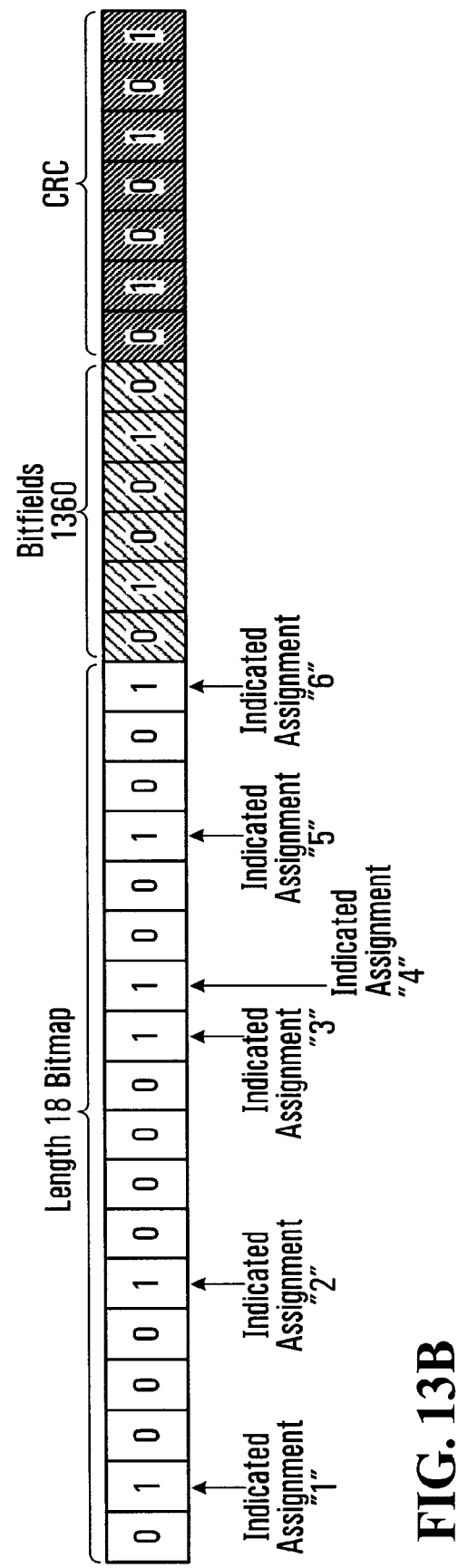
FIG. 13B is a schematic diagram of a group bitmap with a supplemental transmission information field according to an embodiment of the present invention.

FIG. 13B illustrates an example bitmap 1350 with supplemental transmission information bitfields 1360. As in FIG.

13A, the bitmap has a length of 18 bits and a 7 bit CRC, along with the 6 bits of supplemental transmission information.

The supplemental transmission information bitfield is configurable for each group bitmap. The bitfield may operate in one of multiple "1 bit" bitfield modes or one of multiple "2 bit" bitfield modes that will be described in further detail below.

Several examples of "1 bit" bitfield modes, each having two states (i.e. "1" and "0"), are:

New Packet Toggle (NPT)

The NPT mode is a multi-state toggle. This mode prevents ambiguity of transmission to a mobile station in case of an ACK/NAK error, as the bit changes values each time a new packet is started.

New HARQ Packet Start Indicator

In this bitfield, a first state indicates a new packet HARQ transmission and a second state indicates a HARQ re-transmission.

Multiple Packets (MP)

This bitfield allows a base station to specify that two packets are being transmitted to a mobile station and also indicates to other mobile stations of the group that this assignment will use twice the resources.

In some situations, the indication of two packets being transmitted does not imply that the packets have their first HARQ transmission at the same time. In some implementations, the default option may be to specify that two packets are never started at the same time.

Subpacket HARQ Transmission Index (2 State)

This bitfield indicates a subpacket ID for HARQ transmissions for up to two states. If more than two subpackets exist, then it is possible to cycle through the two states multiple time as necessary to accommodate an existing number of subpackets. This may be useful in cases of asynchronous incremental redundancy (IR) HARQ transmissions.

Packet Start Frame (PSF) Within Superframe

This bitfield indicates two starting points, one for each packet, per user, per frame. This bitfield may indicate the frames within the superframe on which a first HARQ packet transmission occurs. This indication simplifies hypothesis detection in the presence of control signaling errors. While the above description refers to frames and superframes, it is to be understood that, more generally, these structures are transmission resources of a given duration for a given communications standard.

Packet Information Field States

This bitfield may be used, for example, to indicate the use of two different packet sizes, but the resource allocation size is intended to stay the same. For example, each of two states signal different packet sizes, and a respective MCS that will enable maintaining a fixed resource allocation size.

Several examples of a 2 bit bitfield mode, each having four states (i.e. "00", "01", "10" and "11") are:

Subpacket HARQ Transmission Index Subpacket ID (SPID)

The mode indicates the subpacket ID for HARQ transmissions for up to four states. If more than four subpackets exist, then it is possible to cycle through the two states multiple time as necessary to accommodate an existing number of subpackets. This is useful in cases of asynchronous IR HARQ transmissions Modified HARQ Sub-Packet Identification Of the four states, a first state indicates a new packet transmission. Other states correspond to subsequently transmitted sub-packets. If the number of re-transmissions is greater than 3, states 2-4 are cycled through again. An example of four states, generalized for a larger number of transmissions is as follows:

the first state is for a first sub-packet transmission;

the second state is for a $2+3n^{th}$ sub-packet transmission (n=0, 1, 2, 3 . . . );

the third state is for a $3+3n^{th}$ sub-packet transmission (n=0, 1, 2, 3 . . . ); and the fourth state is for a $4+3n^{th}$ sub-packet transmission (n=0, 1, 2, 3 . . . ).

In synchronous HARQ, this bitfield may be used to implicitly indicate the start of frames, or to limit the start to at least to a small set of possibilities, given the maximum number of HARQ transmissions.

New Packet Toggle (NPT) (Multi-State Toggle)

This mode prevents ambiguity of transmission to mobile stations in case of ACK/NAK error as the bitfield changes values each time a new packet is started.

PACKET Start Frame (PSF) within Superframe

This bitfield indicates up to four start points, one for each packet, per user, per frame to be signaled uniquely. This bitfield may indicate the frames within the superframe on which a first HARQ packet transmission occurs. This indication simplifies hypothesis detection in the presence of control signalling errors. While the above description refers to frames and superframes, it is to be understood that, more generally, these structures are transmission resources of a given duration for a given communications standard.

4-Packet (Multiple Packets)

This bitfield allows the base station to specify that four packets are being transmitted to a mobile station and also indicates to other mobile stations of the group that this assignment will uses twice the resources.

1-Bit Mode Selector, 1 Bit Mode

In this bitfield, a first bit can be used to select between two modes, while a second bit indicates which of the two states the mode is in. The mode that is not indicated is assumed to be in a default mode.

Hybrid Modes

Toggle (Two State) Combined with MP Indicator

For this mode, the bitfield refers to one packet, or possibly two packets. A "first packet" is the packet with the larger number of re-transmissions, which in the case of asynchronous HARQ indicated that the first packet started initial transmission at an earlier time. The four states include:

a first state is used to indicate a first sub-packet transmission for a first packet;

a second state is used to indicate re-transmission of sub-packet transmission for the first packet;

a third state is used to indicate a first sub-packet transmission for a second packet when the first packet is being re-transmitted. There is an implied restriction for this state that two packets do not start a first HARQ transmission at the same time to the same user;

a fourth state is used to indicate retransmission of sub-packet transmission for the second packet when the first packet is being re-transmitted.

Modified HARQ Subpacket ID (Three State) (Default One Packet)+2 Packet Indictor (One State)

The first state is for a first sub-packet transmission. The second state is for a $2+3n^{th}$ sub-packet transmission (n=0, 1, 2, 3 . . . ). The third state is for a $3+3n^{th}$ sub-packet transmission (n=0, 1, 2, 3 . . . ). The fourth state is for 2-packets, and it is implied that transmission of a "first" packet was started earlier.

Modified HARQ Subpacket ID (Three States) (Default is One Packet)+Start of Frame Bit (Applies to Latest Packet)

The first state is for a first sub-packet transmission. The second state is for a $2+3n^{th}$ sub-packet transmission (n=0, 1, 2, 3 . . . ). The third state is for a $3+3n^{th}$ sub-packet transmission (n=0, 1, 2, 3 . . . ). The fourth state is for two packets, and it is implied that transmission of a first packet of the two packets was started prior to a second packet of the two packets.

Start of Frame Bit (Applies to Latest Packet)/2 Packet Indictor

For this mode, the bitfield refers to one packet, or possibly two packets. When two packets are indicated, the first packet of the two packets is the packet for which transmission was started earlier and as a result has a larger number of re-transmissions. Start frames A and B are frames (or possibly sets of frames) within the set of possible start frames. As an example, for VoIP, the interval between new packets is 20 ms, but a start frame may occur at any frame within the 20 ms interval. The four states include:
  a first state indicates a first packet starts at start frame A;
  a second state indicates a first packet starts at start frame B;
  a third state indicates a second packet starts at start frame A and the first packet is being retransmitted; and
  a fourth state indicates a second packet starts at start frame B and the first packet is being retransmitted. New HARQ Packet Start Indicator and Packet Start Frame (PSF) Within Superframe (3 states)

The four states include:
  a first state is a new packet indication state that indicates a new packet, in which the PSF is set to a default of a current frame;
  a second state is a new packet indication state that indicates a HARQ re-transmission, in which the PSF is set to frame A;
  a third state is a new packet indication state that indicates a HARQ re-transmission, in which the PSF is set to frame B; and
  a fourth state is a new packet indication state that indicates a HARQ re-transmission, in which the PSF is set to frame C.

New HARQ Packet Start Indicator and Packet Start Frame (PSF) within Superframe (2 States)+2 State New Packet Information In this hybrid bitfield, hypothesis detection of the type of packet is removed, provided the user receives the initial transmission bitmap correctly. The four states include:
  a first state is a new packet indication state that indicates a new packet, in which the PSF is set to a default of a current frame. In some embodiments the first state may also indicate some type of packet information, such as, for example, that the packet is a full-rate packet;
  a second state is a new packet indication state that indicates a HARQ re-transmission, in which the PSF is set to frame A;
  a third state is a new packet indication state that indicates a HARQ re-transmission, in which the PSF is set to frame B;
  a fourth state is a new packet indication stated that indicates a new packet, in which the PSF set to a default of a current frame. In some embodiments the fourth state may also indicate some type of packet information that is different than the type of packet information indicated in the first state. For example, the type of packet information in the fourth state may be that the packet is a silence frame indicator (SID) packet.

The above-described bitfields for only "1 bit" and "2 bit" sizes are merely exemplary and are not intended to limit the scope of the invention. Extensions to N-bit field sizes with $2^N$ states contemplated.

In some embodiments, bitfields can be configured as indicated above at the time a user is added to a user group. For example, in an assignment message used to assign a user to a group, there may appear the following fields:

TABLE 5

| Field name | Field size |
| --- | --- |
| Supplemental_Transmission_Information_Field_mode_size | 1 bit |
| Supplemental_Transmission_Information_Field_mode | 2 bits |

The fields can be configured in the following way. The "Supplemental_Transmission_Information_Field_mode_size" field may indicate that the bitfield is either "1 bit" or "2 bits", i.e. a one bit bitfield size allows a "0" for a "1 bit" bitfield and a "1" for a "2 bit" bitfield. The bitfield size will determine the possible modes.

With respect to the "Supplemental_Transmission_Information_Field_mode" field, if the "Supplemental_Transmission_Information_Field_mode_size" is equal a "1 bit" bitfield, an example of the bitfields corresponding to each field mode are:

TABLE 6

| Field mode indicated | Corresponding Mode |
| --- | --- |
| 00 | New Packet Toggle (NPT) |
| 01 | Packet Start Frame (PSF) Within Superframe |
| 10 | Multiple Packets (MP) |
| 11 | New HARQ Packet Start Indicator [Index?] |

If "Supplemental_Transmission_Information_Field_mode_size" is equal to "2 bits", an example of the bitfields corresponding to each field mode are:

TABLE 7

| Field mode indicated | Corresponding Mode |
| --- | --- |
| 00 | Subpacket HARQ Transmission Index SPID |
| 01 | Packet Start Frame (PSF) Within Superframe |
| 10 | Toggle (two state) Combined with MP Indicator |
| 11 | New HARQ Packet Start Indicator and Packet Start Frame (PSF) Within Superframe (2 state) + 2 State New Packet Information |

More generally, a method, according to some embodiments, includes signalling a group of users with a group bitmap, wherein the group bitmap includes at least one bitfield that provides additional information about the one or more resource blocks allocated to the at least one user of the respective partition. The at least one bitfield includes a first portion of the at least one bitfield that indicates a number of bits N that are used to define further transmission information; and a second portion of the at least one bitfield that indicates one of a plurality of transmission information modes that has $2^N$ states.

In some embodiments, decoding of the bitmap is facilitated by having some information of the size of the bitmap. Using a similar concept for the fields described above, the bitmap length with this field can be either: known; determinable; and determinable to a set of possibilities.

In some embodiments, the mobile station knows the assignment bitmap and CRC lengths from the message assigning it to a group. The Supplemental Transmission Information bitfield itself can be determined in several ways.

If the number of resources assigned to the group (not including bitmap signaling) is known and the number of resources per assignment are known, then the number of indicated assignments can be determined prior to bitmap decoding. Hence with knowledge of the assignment bitmap and CRC length (plus any other fields), the total bitmap length can be known.

In a specific example, a combination index indicates that the partition size for a group assignment is five resource blocks. Furthermore, it is known through signalling, or otherwise, that the assignment bitmap has 10 bits, which represents 10 possible user assignments, the CRC is 7 bits, the Supplemental Transmission Information Field is 1 bit and each assignment is 1 resource block. Based on this information, it can be determined that there are five indicated assignments (one for each resource block) and that the bitmap size is 22 bits in length. This length is determined from the 10 bits of the assignment bitmap, 5 additional Supplemental Transmission Information Field bits, one bit for each of the five indicated assignments and the 7 CRC bits.

Additionally, a Supplemental Transmission Information bitfield can indicate a different number of resources per assignment. The bitfield may then be padded to fit a desired number of bits. This is a default assumption of both a transmitter and user. This is the case if a bitmap is configured to use a multi-packet bitfield as indicated in the description above.

In another specific example, a combination index indicates that the partition size for a group assignment is five resource blocks. Furthermore, it is known through signalling, or otherwise, that the assignment bitmap has 10 bits, which represent 10 possible user assignments, the CRC is 7 bits, the Supplemental Transmission Information Field is 1 bit, and the mode is set to MP with 2-states (i.e. 1 or 2 packets). Each assignment is 1 or 2 resources.

Based on this information, it can be determined that there are up to five indicated assignments, (one for each resource block) and that the bitmap size is 22 bits in length. This length is determined from the 10 bits of the assignment bitmap, 5 Supplemental Transmission Information bits, one bit for each of the five indicated assignments and the 7 CRC bits.

The amount of resource being assigned can also follow several options, for example as described above.

The number of resources can be specified within a resource partition including data. In some embodiments, for UL allocations, it is useful to have all assignment messages in one partition.

In some cases, if the bitmap size in bits is known, and the resource size for the bitmap is known, a modulation and coding scheme (MCS) can be selected from one or more MCS available to enable a desired amount of transmission resource.

A resource allocation bitmap can appear at the beginning of a partition. In this manner, some resources of the partition are used for assignment signaling. As the size of the resource allocation bitmap can be derived as described above, the user is able to determine left over resource for data. The portion of the partition used for assignment signaling does not necessarily have to be an integer number of resources.

In another specific example, a resource block is 96 modulation symbols. An assignment message is determined to be 35 modulation symbols, but the user would still consider five resource blocks to be used for data assignment. However, the first resource block would only contain 61 modulation symbols of the 96 modulation symbols for data as the assignment message is the remaining 35 modulation symbols.

It is also a useful approach to consider a limit on the size of a bitmap before a resource block is assigned to it. In addition, a different MCS may be assumed once an entire resource block is assigned to it. The MCS may be the MCS which provides the closest match to the appropriate number of integer resources blocks, without exceeding the number of resource blocks.

In another specific example, a resource block is 96 modulation symbols, and there is a limit of 25 modulation symbols for an assignment message size before an entire resource block is assigned to it. In addition, the available MCS are: QPSK rate 1/2, QPSK rate 1/4, and QPSK, rate 1/4 with 4 repetitions.

If the resource allocation bitmap is 22 bits in length, the MCS will be selected as QPSK rate 1/2. As QPSK uses 2 bits per modulation symbol for full fate, QPSK rate 1/2 needs to transmit twice the number of bits to transmit the same modulation symbols. Therefore, the QPSK rate 1/2 results in 22 modulation symbols. The resource allocation bitmap will be assigned the first 22 modulation symbols of the first allocation. Partition size will be five resource blocks for signaling and data.

If the resource allocation bitmap is 32 bits in length, none of the available MCS will allow a transmission size of less then 25 modulation symbols, hence a whole resource block of 96 modulation symbols will be allocated for signaling. The MCS that gives the closest fit without exceeding the allocation is QPSK rate 1/3 (48 bits). The partition size will be 6 resource blocks for signaling and data, 5 for data and one for signalling.

If the resource allocation bitmap is 98 bits in length, none of the available MCS will allow a transmission size of less then 25 modulation symbols, hence a whole resource block of 96 modulation symbols will be allocated for signaling. Also, none of the available MCS will allow a transmission size of less then 96 modulation symbols and hence a portion of the second resource block will be assigned to the assignment message. The MCS that will be selected is QPSK rate 1/2 (98 modulation symbols) and the resource allocation bitmap will be assigned the first resource block and the first 2 modulation symbols of the second allocation. Partition size will be 6 resource blocks for signaling and data, 5 for data and one for signalling.

A bitmap transmission that contains other fields, without or without presence of the Supplemental Transmission information field, can be transmitted in the same manner.

A group can be signalled by a mobile station (MS) assignment (or allocation) index (MSAI). In some embodiments, the MSAI replaces the resource availability bitmap.

A group is a set of users. In some embodiments a user can belong to more than one group.

The users of the groups are ordered. In this manner, a user's assignments can be specified by a '1' for an active assignment in the appropriate position of a given ordered assignment for the group.

The MSAI is an index with a one-to-one relation to a set of ordered user assignments (active and inactive) given knowledge of the total number of active assignments and number of total users in the group (active or inactive). A table can be created of possible MSAI's and the corresponding ordered user assignments. In some cases, this table can be replaced by a process or function to derive the ordered assignments from the MSAI given appropriate parameters.

The MSAI can be used to signal resource assignments on the UL and DL, and can be used for one or more (possibly all) transmission of a packet.

Ordered assignments indicate which users are active ('1') and which users are inactive ('0'). A user can be assigned a pre-determined position in an ordered group. This assignment may be indicated when the user is assigned to the group.

For example, for a group of four users, an ordered assignment of "1010" means the second and fourth users are inactive, and the first and third users of the group are active.

In some embodiments, to create a MSAI for a given number of users per group and a given number of active assignments, a table is formed in which each entry in the table contains a MSAI number, a MS assignment index bitfield value, and a corresponding ordered assignment (for example, see the headers of Table 8 below).

During a given set of user assignments (active and inactive) for a group, a transmitter sends the MSAI entry corresponding to the ordered assignments from the table that define the group size and number of active assignments.

The receiver (MS, group of MS, etc.) may know or determine the number of user in the group, and the number of active assignments in order to determine the appropriate table to use.

In some case, users who are signalled in the group will know the number of users in the group.

In some cases, the number of active assignments is signalled, or can be derived from other parameters such as number of resource assigned to a group and the number of resource per group assignment.

The receiver can than determine the ordered assignments given the MSAI using the appropriate table (or function and parameters)

If the receiver is assigned a position (ordered location) in the group, it can observe whether it has been given an active assignment (assigned resources), or set to inactive assignments (not assigned resources) by checking its position in the ordered assignment.

The bits needed to signal active and inactive assignments to users can be reduced compared to for instance using an RAB described above, by sending an MS assignment index. The index uses fewer bits as it assumes knowledge of the number of active assignments for group.

Examples of MSAIs follow in the form of tables for two, three and four users in a group (active and inactive assignments), with 2 active assignments for each case. In the examples, the number of resources per user assignment is 1.

Other tables, or even formulas or relationships, are possible. All that is required is that from the index, it is possible to drive the set of assignments for a group of users.

In the following tables, the "Ordered Assignments" column is equivalent the group assignment bitmap.

Table 8 provides MSAI for two users per group, 2 active assignments. For this case, there is only one ordered assignment that represents this condition. Therefore, the MSAI indication is a single bit. As only a single state of the single bit is needed to express this condition, the other state can be used for indication of another feature.

TABLE 8

Two users per group, 2 active assignments

| MSA Index number | MSAI field (1 bit) | Ordered Assignments (RAB) |
|---|---|---|
|  |  | 00 |
|  |  | 01 |
|  |  | 10 |
| 0 | 0 | 11 |
| 1 | 1 | Reserved field |

Table 9 provides MSAI for three users per group, 2 active assignments. For this case, there are three ordered assignments that represent this condition. Therefore, the MSAI indication is only two bits to represent all three cases. The fourth value of the field can be used for indication of another feature or case (reserved).

TABLE 9

Three users per group, 2 active assignments

| MSA Index number | MSAI field | Ordered Assignments (RAB) |
|---|---|---|
|  |  | 000 |
|  |  | 001 |
|  |  | 010 |
| 0 | 00 | 011 |
|  |  | 100 |
| 1 | 01 | 101 |
| 2 | 10 | 110 |
|  |  | 111 |
| 3 | 11 | Reserved |

Table 10 provides MSAI for four users per group, 2 active assignments. For this case, there are six ordered assignments that represent this condition. Therefore, the MSAI indication is only three bits to represent the six cases. The seventh and eighth values of the field can be used for indication of other features or cases (reserved 1 and 2).

TABLE 10

4 users per group, 2 active assignments

| MSA Index number | MSAI field | Ordered Assignments (RAB) |
|---|---|---|
|  |  | 0000 |
|  |  | 0001 |
|  |  | 0010 |
| 0 | 000 | 0011 |
|  |  | 0100 |
| 1 | 001 | 0101 |
| 2 | 010 | 0110 |
|  |  | 0111 |
|  |  | 1000 |
| 3 | 011 | 1001 |
| 4 | 100 | 1010 |
|  |  | 1011 |
| 5 | 101 | 1100 |
|  |  | 1101 |
|  |  | 1110 |
|  |  | 1111 |
| 6 | 110 | Reserved 1 |
| 7 | 111 | Reserved 2 |

Table 11 provides MSAI for four users per group, 1 active assignment. For this case, there are four ordered assignments that represent this condition. Therefore, the MSAI indication is only two bits to represent the four cases.

TABLE 11

Four users per group, 1 active assignment

| MSA Index number | MSAI field | Order Assignments (conventional bitmap) |
|---|---|---|
|  |  | 0000 |
| 0 | 00 | 0001 |
| 1 | 01 | 0010 |
|  |  | 0011 |
| 2 | 10 | 0100 |
|  |  | 0101 |
|  |  | 0110 |
|  |  | 0111 |
| 3 | 11 | 1000 |
|  |  | 1001 |
|  |  | 1010 |
|  |  | 1011 |
|  |  | 1100 |
|  |  | 1101 |
|  |  | 1110 |
|  |  | 1111 |

In order to find a correct table to decode the bitfield, the MS must know or be able to determine, or set a bound on: a number of users in the group; a number of active assignments.

If the MS can determine the correct table to use, it will also more the length in bits of the MSAI field. Knowledge of the length of the MSAI field will assist the mobile in detection and decoding of the group assignment message.

In some embodiments, the number of active assignments (defined as 'A') is signalled.

In other embodiments, the number of assigned resources to the group is signalled (define as 'R'), and the number of active assignments can be derived from this value.

If the number of assigned resources ('R') is known, the number of active assignments ('A') is derived by dividing the number of assigned resources by the number of resource per user active assignment (defined by 'U'). This is expressed as: A=R/U.

The following is a particular example of an MS using a number of group resources to derive a number of assignments and an MSAI table.

A group of four users is assigned 2 resources. The number of resources per user assignment is 1. The first and fourth users of the group are active (assigned resources). This would result in an RAB value '1001'.

At the transmitter:

The ordered assignments bitfield "1001" is located in a lookup table for four users per group, 2 active assignments (Table 10). This value corresponds to MSA Index 3, and corresponds to MSAI bitfield "011". A MSAI of "011" (3 bits) is sent.

At the receiver:

The mobile station knows that the group is assigned 2 resources, and there is 1 resource per user assignment. Hence, there are two user assignments. The size of the group is already known by the user, and in this case it is four. The mobile station therefore uses a table for four users, 2 active assignments (Table 10), and determines that the field length is 3 bits.

Upon decoding, the MSAI field of "011" is determined, and mobile station determines the ordered assignments bitmap of "1001". The mobile station is then able to determine its assignment based on its assigned position in the group.

The MSAI bitfield can be used to efficiently signal some or all transmissions of a packet transmission.

In some embodiments, the MSAI bitfield can signal HARQ re-transmissions for a group of users, where the group of users has a persistent assigned first HARQ transmission opportunity.

In some embodiments, the details of this are as follows. As a first transmission is persistently assigned, signalling is not needed for this transmission. A resource availability bitmap may be used to indicate to other users/groups which resources are "in use". For re-transmissions, the users who have been allocated resources for a HARQ re-transmission of packet are indicated by the MSAI. As the number of user in a group who require re-transmission may be small in some cases, there is potential savings in overhead in comparison to signalling the ordered bitmap of assignments explicitly.

It may be advantageous to configure the group of users such that each of users of the group have their first transmission opportunity in the same sub-frame (or frame, or scheduling event).

In a particular example, for a group of four users, all four users are allocated as predefined or persistent resources for their first HARQ transmission.

At a specific scheduling interval, all four users have a first HARQ packet transmission which is sent on persistent resources. The group is not signalling is this scheduling interval.

At a later time the group is scheduled for a first re-transmission opportunity. A packet for user 2 has need of a second transmission, whereas packets for user 1, 3, and 4 have been received successfully and do not require re-transmission. The ordered assignments can be expressed as '0100', and an appropriate MSAI can be sent to indicate the assignments. Using the example Table 11, the MSAI bitfield '10' can be sent to represent the active/inactive assignments for the users of the group. This process can be repeated for further re-transmissions.

UL Resource Partition Bitfield

In some embodiments, when allocating UL resources, a bitfield specifying a UL partition number for the assignment is appended to the resource assignment group bitmap. While part of the resource assignment bitmap defines resources to be used for UL, the UL partition number defines the specific resources for a given user.

In some embodiments, the index is used to link a resource assignment message to a particular resource. Resource assignment messages are appended by a bit field specifying the resource for assignment.

In the case of resource partitions, the partition number for the assignment can be specified in the bitfield. Multiple assignments can point to the same resources or partition. For UL, this facilitates collaborative spatial multiplexing (CSM), for example virtual MIMO, as multiple user are assigned to the same resource.

However, a similar premise can be used for DL as well, for example for multi-user MIMO.

A bitfield specifying a partition number can be appended to a unicast message (intended for a single user) or a group assignment message.

In some implementations, a group assignment message, such as a group bitmap, which can be used to signal VoIP allocations, can be appended with a bitfield indicating the partition number to where the group has been assigned resources.

As described, multiple group bitmaps can indicate the same partition so that multiple group assignments are assigned to the same set of resources. For example, multiple bitmaps can be assigned to the same partition. Multiple groups can be assigned to the same partition to support collaborative spatial multiplexing (CSM).

In some cases when multiple groups bitmaps or unicast assignments are assigned to the same partition, the assignments may be of different sizes. In such case, if the size of the assignment is known to be different from the partition size, and the mobile can observe that the assignment size is greater than the partition size, the assignment that has indicated assigned resources greater than the partition size will "wrap around" after the end of the partition.

Mobile stations can derive a total number of assigned resources to a group from a resource allocation bitmap, and compare this value with an indicated resource partition size.

Figure 18:
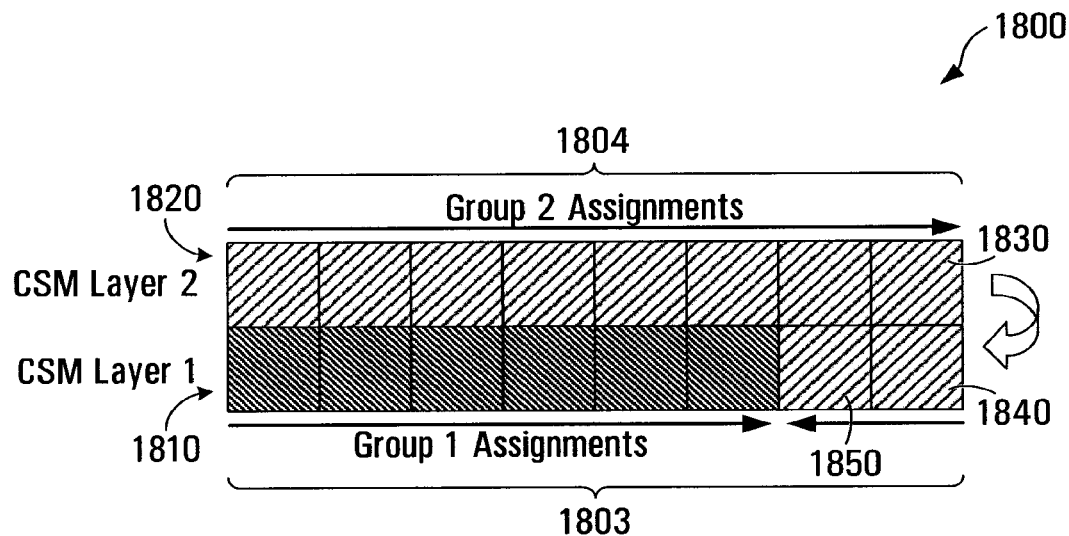
FIG. 18 is a schematic diagram of a time-frequency resource for collaborative spatial multiplexing (CSM) which can be allocated to groups of users according to an embodiment of the invention.

FIG. 18 illustrates an example of a time-frequency resource 1800 that is used for collaborative spatial multiplexing (CSM), having two layers 1803, 1804, one for each group of users. A first group has six assigned resources and a second group has ten assigned resources. A partition size is set to be eight assignments. The first group is assigned less allocated resources than the partition size starting from a first assigned resource 1810 for that layer 1803. The second group is assigned more allocated resources than the partition size starting from a first assigned resource 1820 for that layer 1804. Once the "last" resource 1830 is reached in that layer 1804, the next assignment "wraps around" to be on the last resource 1840 of layer 1803, followed by the second last resource 1850 in layer 1803 as those resources are unused by the first group in layer 1803.

In some embodiments, such a process may allow efficient packing of different sized group assignments.

In addition, a users ordering index can also be used to allocate users in a specific order. The users ordering index is a special case of user set combination index, with user set size equal to 1. For a number of indicated assignments, a table can be created of possible ordering of users. For example, Table 4 above showing ordering of 3 indicated assignments and corresponding table of indices.

User set ordering index may also be used to "shuffle" the assignments of one or more group bitmaps to allow further control over which users are grouped together for optimization.

In some embodiments, the user ordering index can be appended to high geometry bitmap to minimize overhead.

Some embodiments of the invention include a method for use with a time-frequency transmission resource comprising at least one subzone, each subzone comprising at least one partition, each partition having at least one resource block, each resource block having a plurality of transmission symbols on a plurality of sub-carriers, wherein one or more resource blocks are allocated to each of at least one user in a respective partition. For each partition, signalling is performed to a group of users using a group bitmap, wherein the group bitmap includes at least one bitfield that provides additional information about the one or more resource blocks allocated to the at least one user of the respective partition.

In some embodiments, the at least one bitfield may include one or more of, but not limited to; the resource permutation index, user pairing or user sets combination index, supplemental transmission information, mobile station assignment index, UL resource partition index and user set ordering index. In some embodiments the one or more bitfields can be encoded with CRC and sent together as one message.

Description of Example Components of a Relay System

Figure 14:
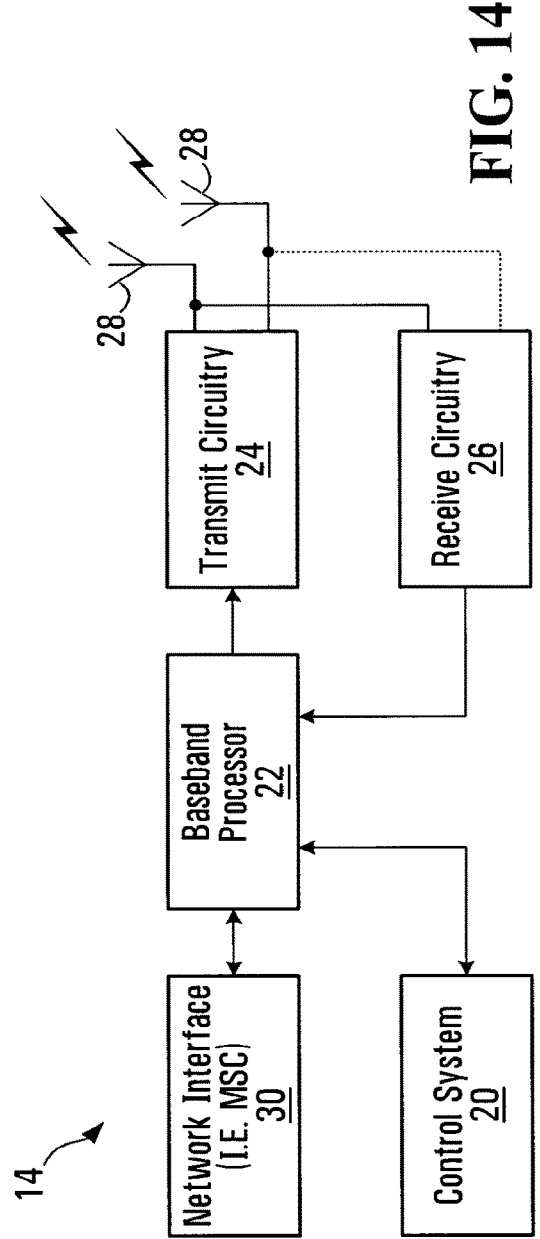
FIG. 14 is a block diagram of an example base station that might be used to implement some embodiments of the present invention.

A high level overview of the mobile terminals 16 and base stations 14 upon which aspects of the present invention are implemented is provided prior to delving into the structural and functional details of the preferred embodiments. With reference to FIG. 14, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 1). A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 15:
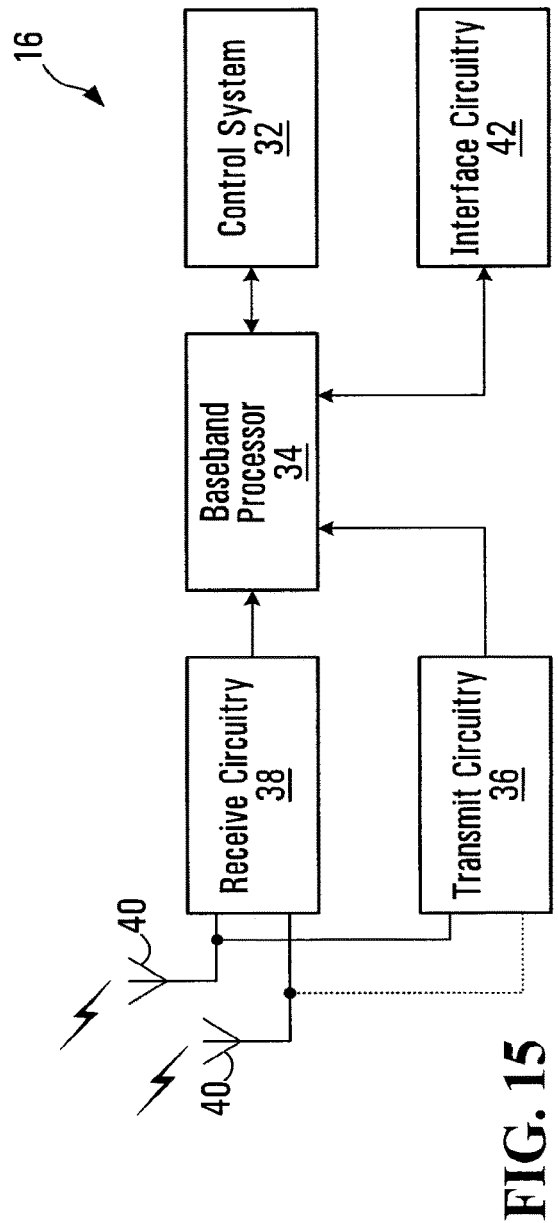
FIG. 15 is a block diagram of an example wireless terminal that might be used to implement some embodiments of the present invention.

With reference to FIG. 15, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labelled only for clarity.

Figure 16:
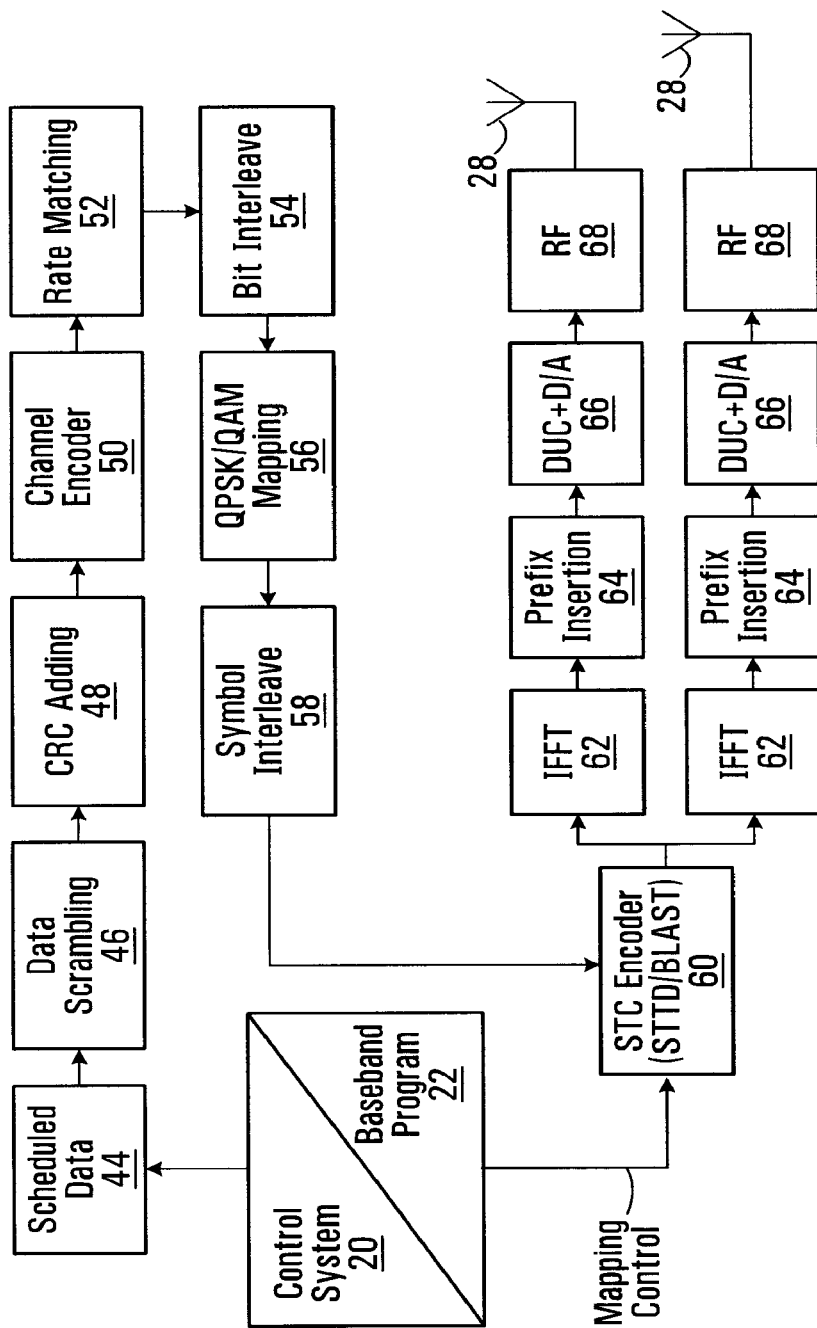
FIG. 16 is a block diagram of a logical breakdown of an example OFDM transmitter architecture that might be used to implement some embodiments of the present invention.

With reference to FIG. 16, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 17 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 17:
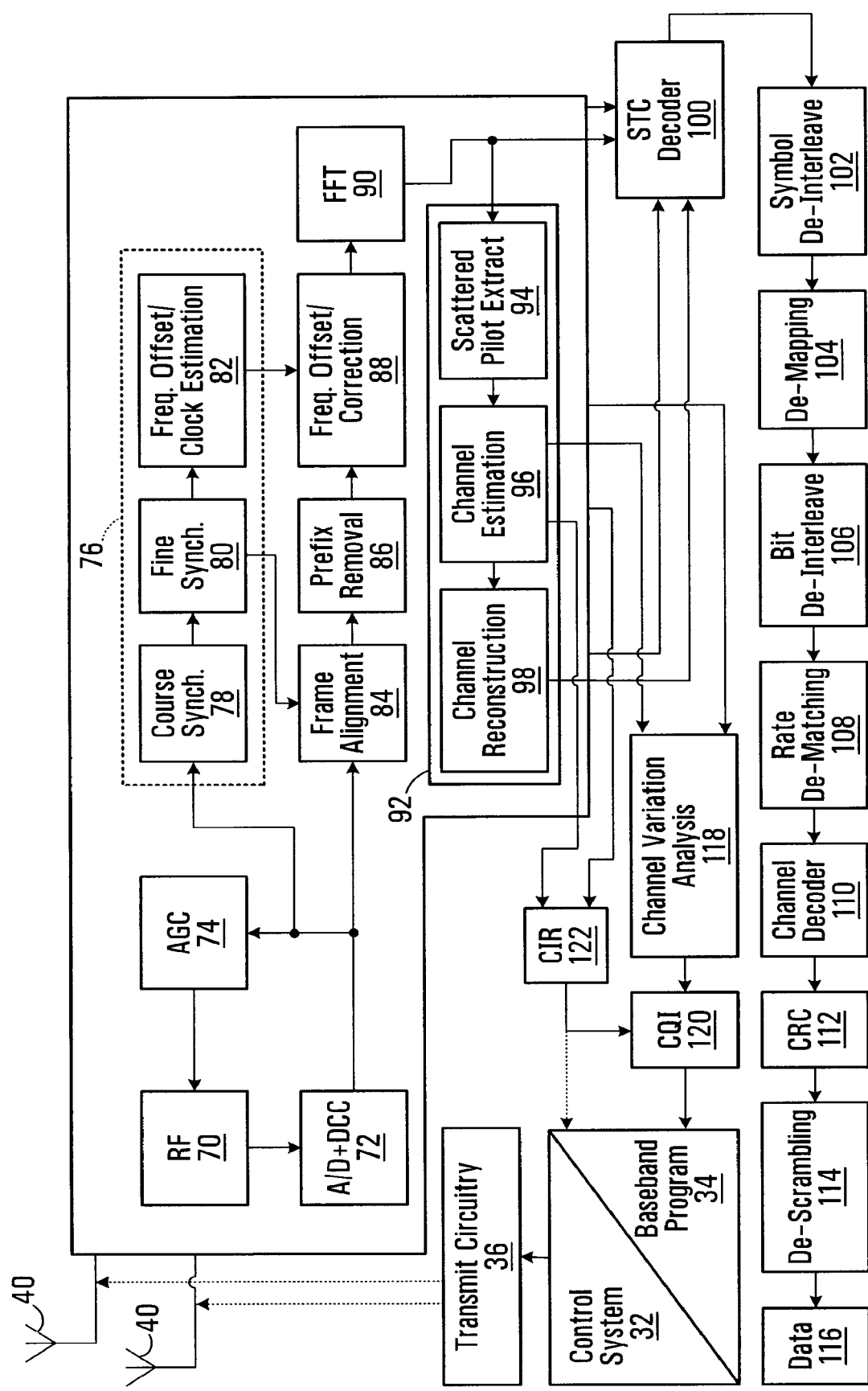
FIG. 17 is a block diagram of a logical breakdown of an example OFDM receiver architecture that might be used to implement some embodiments of the present invention.

Reference is now made to FIG. 17 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 17, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 and 14 to 17 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

Numerous modifications and variations of the present invention are possible in light of the above teachings. It is therefore to be understood that within the scope of the appended claims, the invention may be practised otherwise than as specifically described herein.

The invention claimed is:

1. A method for operating a user equipment (UE) device to facilitate communication using time-frequency resources, each time-frequency resource comprising a plurality of transmission symbols, each of the transmission symbols spanning a plurality of subcarriers, the method comprising:
   receiving one or more messages, from a base station, associated with a persistent assignment;
   transmitting, to the base station, based on the one or more messages, at least a first HARQ transmission using a portion of at least one subzone in one or more of the time-frequency resources, where the portion is assigned on a persistent basis to the UE device, wherein each time-frequency resource comprises one or more sub-zones, and wherein each subzone comprises at least one block of channel units, with each block of channel units comprising at least one sub-carrier used for all transmission symbols in the subzone; and
   releasing the portion for at least a temporary duration of time, wherein said releasing is based at least in part on a termination condition received from the base station in the one or more messages.

2. The method of claim 1, wherein said releasing the portion for at least a temporary duration of time comprises releasing the portion when the portion is not used by the UE device for packet data transmission.

3. The method of claim 1, wherein said releasing the portion for at least a temporary duration of time comprises releasing the portion based on a timeout since a last packet data transmission has occurred.

4. The method of claim 1, wherein the termination condition received in the message indicates a duration of a timeout on which termination is based.

5. The method of claim 4, wherein the message is a persistent assignment message.

6. The method of claim 1,
wherein the one or more subzones comprise a plurality of subzones;
wherein two or more of the subzones have been grouped together to form a subzone group; and
wherein, in at least two of the time-frequency resources, the grouping of subzones is scrambled.

7. The method of claim 1, further comprising:
receiving signaling from the base station, wherein the signaling includes at least one of unicast signaling and group signaling, wherein the signaling assigns HARQ retransmission associated with the first HARQ transmission.

8. A user equipment (UE) device for communication using time-frequency resources, each time-frequency resource comprising a plurality of transmission symbols, each of the transmission symbols spanning a plurality of subcarriers, the UE device comprising:
transmit circuitry;
receive circuitry; and
one or more processors coupled to the transmit circuitry and the receive circuitry, the one or more processors configured to cause the UE device to:
receive one or more messages, from a base station, associated with a persistent assignment;
transmit, to the base station, using the transmit circuitry, based on the one or more messages, at least a first HARQ transmission using a portion of at least one subzone in one or more of the time-frequency resources, where the portion is assigned on a persistent basis to the UE device, wherein each time-frequency resource comprises one or more subzones, and wherein each subzone comprises at least one block of channel units, with each block of channel units comprising at least one sub-carrier used for all transmission symbols in the subzone; and
release the portion for at least a temporary duration of time, wherein said releasing is based at least in part on a termination condition received, using the receive circuitry, from the base station in the one or more messages.

9. The UE device of claim 8, wherein said releasing the portion for at least a temporary duration of time comprises releasing when the portion is not needed by the UE device for packet data transmission.

10. The UE device of claim 8, wherein the termination condition received in the message indicates a duration of a timeout on which termination is based.

11. The UE device of claim 10, wherein said releasing the portion for at least a temporary duration of time comprises releasing the portion based on the timeout, wherein the timeout is a time since a last packet data transmission has occurred.

12. The UE device of claim 8,
wherein the one or more subzones comprise a plurality of subzones;
wherein two or more of the subzones have been grouped together to form a subzone group; and
wherein, in at least two of the time-frequency resources, the grouping of subzones is scrambled.

13. The UE device of claim 8, wherein the one or more processors are further configured to cause the UE device to:
receive signaling from the base station, wherein the signaling includes at least one of unicast signaling and group signaling, wherein the signaling assigns HARQ retransmission associated with the first HARQ transmission.

14. The UE device of claim 8, wherein said releasing the portion for at least a temporary duration of time comprises releasing the portion based on an occurrence of N packet transmission or reception failures, wherein N is greater than or equal to one.

15. A apparatus for communication using time-frequency resources, each time-frequency resource comprising a plurality of transmission symbols, each of the transmission symbols spanning a plurality of subcarriers, the apparatus comprising:
a memory; and
one or more processors coupled to the memory, the one or more processors configured to cause the apparatus to:
receive one or more messages, from a base station, associated with a persistent assignment;
transmit, to the base station, based on the one or more messages, at least a first HARQ transmission using a portion of at least one subzone in one or more of the time-frequency resources, where the portion is assigned on a persistent basis to the apparatus, wherein each time-frequency resource comprises one or more subzones, and wherein each subzone comprises at least one block of channel units, with each block of channel units comprising at least one sub-carrier used for all transmission symbols in the subzone; and
release the portion for at least a temporary duration of time, wherein said releasing is based at least in part on a termination condition received from the base station in the one or more messages.

16. The apparatus of claim 15, wherein said releasing the portion for at least a temporary duration of time comprises releasing the portion during a silence period of a VoIP call.

17. The apparatus of claim 16, wherein the portion is not used by the apparatus for packet data transmission during the silence period of the VoIP call.

18. The apparatus of claim 15, wherein the termination condition received in the message indicates a duration of a timeout on which termination is based.

19. The apparatus of claim 18, wherein said releasing the portion for at least a temporary duration of time comprises releasing the portion based on the timeout, wherein the timeout is a time since a last packet data transmission has occurred.

20. The apparatus of claim 15,
wherein the one or more subzones comprise a plurality of subzones;
wherein two or more of the subzones have been grouped together to form a subzone group; and
wherein, in at least two of the time-frequency resources, the grouping of subzones is scrambled.

* * * * *